(12) United States Patent
Ohtomo et al.

(10) Patent No.: US 11,193,765 B2
(45) Date of Patent: Dec. 7, 2021

(54) SURVEYING INSTRUMENT AND PHOTOGRAMMETRIC METHOD

(71) Applicant: TOPCON Corporation, Tokyo-to (JP)

(72) Inventors: Fumio Ohtomo, Saitama (JP); Kaoru Kumagai, Tokyo-to (JP); Tetsuji Anai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 54 days.

(21) Appl. No.: 16/707,001

(22) Filed: Dec. 9, 2019

(65) Prior Publication Data
US 2020/0182614 A1    Jun. 11, 2020

(30) Foreign Application Priority Data

Dec. 11, 2018 (JP) .............................. JP2018-231315

(51) Int. Cl.
*G01C 11/10* (2006.01)
*G01C 11/02* (2006.01)

(52) U.S. Cl.
CPC ............ *G01C 11/10* (2013.01); *G01C 11/025* (2013.01)

(58) Field of Classification Search
CPC ...... G01S 7/4817; G01S 7/4808; G01S 17/42; G01S 17/86; G01C 15/004; G01C 15/06; G01C 15/008; G01C 11/025
See application file for complete search history.

(56) References Cited

U.S. PATENT DOCUMENTS

2012/0163656 A1* 6/2012 Wang ...................... G06T 7/73
                                                   382/103
2012/0330601 A1* 12/2012 Soubra ................... G01S 1/725
                                                   702/150
2016/0238385 A1    8/2016 Ohtomo et al.
2016/0238708 A1    8/2016 Ohtomo et al.
2016/0259039 A1    9/2016 Ohtomo et al.
(Continued)

FOREIGN PATENT DOCUMENTS

JP    2016-151422 A    8/2016
JP    2016-151423 A    8/2016
(Continued)

OTHER PUBLICATIONS

European communication dated Aug. 12, 2020 in corresponding European patent application No. 19214639.7.

*Primary Examiner* — Luke D Ratcliffe
(74) *Attorney, Agent, or Firm* — Nields, Lemack & Frame, LLC

(57) ABSTRACT

There is provided a surveying instrument including a distance measuring unit configured to measure a distance to an object to be measured, a measuring direction image pickup module which includes the object to be measured and is configured to acquire as observation image, an attitude detector is configured to detect a tilt of the surveying instrument main body and a arithmetic control module, and wherein the arithmetic control module is configured to extract each common corresponding point from a first image acquired at a first installing point and a second image acquired at a second installing point, perform the matching based on the corresponding point, and make a measurement of a positional relationship of the object to be measured with respect to the first installing point and the second installing point based on a matching image.

20 Claims, 9 Drawing Sheets

(56) References Cited

U.S. PATENT DOCUMENTS

| | | | |
|---|---|---|---|
| 2017/0125064 A1* | 5/2017 | Aggarwal | G06K 9/00744 |
| 2017/0227357 A1 | 8/2017 | Ohtomo et al. | |
| 2018/0180416 A1* | 6/2018 | Edelman | G01C 15/002 |
| 2018/0329041 A1 | 11/2018 | Ohtomo et al. | |

FOREIGN PATENT DOCUMENTS

| | | |
|---|---|---|
| JP | 2016-161411 A | 9/2016 |
| JP | 2017-142081 A | 8/2017 |

\* cited by examiner

SURVEYING INSTRUMENT AND PHOTOGRAMMETRIC METHOD

BACKGROUND OF THE INVENTION

The present invention relates to a surveying instrument which can be easily installed and a photogrammetric method.

At the time of measuring (a size or the three-dimensional coordinates) an object to be measured, the photogrammetry using an image acquisition device such as a camera or the three-dimensional surveying using a three-dimensional laser scanner is performed. The photogrammetry enables measuring the object to be measured in a short time. Further, the photogrammetry allows for the measurement to a relatively distant place as long as the object to be measured can be recognized in an image.

However, in case of the photogrammetry, a resolution of depth is determined by the pixels and a BH ratio (a ratio of a distance between two photographing positions and a distance to the object to be measured), and there is a limit in a measurement accuracy. Further, the photogrammetry requires performing the internal orientation configured to correct a distortion of a camera, the relative orientation configured to associate the images acquired at two positions with each other, and the absolute orientation using an orienting point (a reference point). Therefore, the photogrammetry requires the skills.

On the other hand, the laser scanner can easily measure a shape of the object to be measured. However, in case of precisely measuring the object to be measured, the scan density must be increased, and hence the measurement needs time. Further, in case of a laser scanner having no verticality reference, an orienting point (a reference point) must be provided, a survey of the reference point must be made by another means, and a tilt of the laser scanner must be corrected. Further, in case of the laser scanner, there is a limit in a measurement distance, and measuring the distant object to be measured is difficult.

SUMMARY OF INVENTION

It is an object of the present invention to provide a surveying instrument and a photogrammetry method which enable the high-density three-dimensional measurement in a short time.

To achieve the object as described above, a surveying instrument according to the present invention includes a surveying instrument comprising a monopod which is movable and sequentially installed at least at a first installing point and a second installing point which is a predetermined position with respect to the first installing point and a surveying instrument main body which is provided at a known distance from a lower end of the monopod and at a known angle with respect to an axis of the monopod and has a reference optical axis, wherein the surveying instrument main body comprises a distance measuring unit configured to irradiate a distance measuring light, receive a reflected distance measuring light and measure a distance to an object to be measured, a measuring direction image pickup module which includes the object to be measured and is configured to acquire an observation image in a predetermined relationship with the reference optical axis, an attitude detector is configured to detect a tilt of the surveying instrument main body with respect to the horizontal or the vertical and an arithmetic control module configured to make the distance measuring unit perform a distance measurement of a predetermined measuring point and make the measuring direction image pickup module acquire an image of the object to be measured, and wherein the arithmetic control module is configured to extract each common corresponding point from a first image acquired at the first installing point and a second image acquired at the second installing point, perform the matching of the first image and the second image based on a distance measurement value of the corresponding point or a vicinity of the corresponding point in the first image acquired by the distance measuring unit and a distance measurement value of the corresponding point or the vicinity of the corresponding point in the second image acquired by the distance measuring unit, and make a measurement of a positional relationship of the object to be measured with respect to the first installing point and the second installing point based on a matching image.

Further, in the surveying instrument according to a preferred embodiment, the surveying instrument main body further comprising an optical axis deflector which deflects the distance measuring light with respect to the reference optical axis, and wherein the arithmetic control module is configured to make the optical axis deflector perform the scan using the distance measuring light by a predetermined scan pattern, make the distance measuring unit acquire the point cloud data along the scan pattern, complement the distance measurement data of a part deviating from the scan pattern by the photogrammetry, and acquire the three-dimensional data of the object to be measured.

Further, in the surveying instrument according to a preferred embodiment, in a case where the object to be measured has a wide intersection angle with respect to the first image and the second image, wherein the arithmetic control module is configured to complement a distance measurement data by the photogrammetry with respect to a part deviating from the scan pattern where the electronic distance measurement by the distance measuring unit is impossible.

Further, in the surveying instrument according to a preferred embodiment, the arithmetic control module is configured to tilt the monopod rightward or leftward with respect to the object to be measured after acquiring the first image, acquire an auxiliary first image, tilt the monopod rightward or leftward with respect to the object to be measured after acquiring the second image, acquire an auxiliary second image, perform the photogrammetry with a narrow intersection angle based on the first image and the auxiliary first image, calculate a rough three-dimensional position of the object to be measured with respect to the first installing point based on the photogrammetry, perform the photogrammetry with a narrow intersection angle based on the second image and the auxiliary second image, and calculate a rough three-dimensional position of the object to be measured with respect to the second installing point based on the photogrammetry.

Further, in the surveying instrument according to a preferred embodiment, the arithmetic control module is configured to extract the common corresponding points from the first image and the second image, compare the rough three-dimensional positions of the corresponding points in the first image with the rough three-dimensional positions of the corresponding points in the second image, extract the corresponding points which are roughly matched with each other, and perform the matching of the first image and the second image based on the extracted corresponding points.

Further, in the surveying instrument according to a preferred embodiment, the first image and the second image are the images acquired by a wide intersection angle.

Further, in the surveying instrument according to a preferred embodiment, an auxiliary leg is provided to the monopod, and the tilt in a front-and-back direction and the rotation of the monopod is regulated by the auxiliary leg.

Further, in the surveying instrument according to a preferred embodiment, the arithmetic control module is configured to measure a measuring point of an arbitrary position on the object to be measured from the first installing point, measure the measuring point from the second installing point, and calculate the three-dimensional coordinates of the second installing point with reference to a three-dimensional coordinate of the first installing point by a resection.

Further, in the surveying instrument according to a preferred embodiment, a reference target is installed at the first installing point, wherein the arithmetic control module is configured to measure the reference target from the second installing point, and calculate a three-dimensional coordinate of the second installing point with reference to a three-dimensional coordinate of the first installing point based on a measurement result.

Further, in the surveying instrument according to a preferred embodiment, the surveying instrument main body further comprising a GPS device, and the three-dimensional coordinates of the first installing point and the second installing point are acquired by the GPS device.

Further, a photogrammetric method according to the present invention comprising: having a monopod installed at an installing point, a surveying instrument main body which is provided at a known distance from a lower end of the monopod and at a known position with respect to an axis of the monopod and has a reference optical axis, a measuring direction image pickup module which is provided to the surveying instrument main body, includes an object to be measured and is configured to acquire an observation image in a predetermined relationship with the reference optical axis, an attitude detector is configured to detect a tilt of the surveying instrument main body with respect to the horizontal or the vertical, and an arithmetic control module is configured to perform the acquisition of an image of the object to be measured, sequentially installing the monopod at least at a first installing point and a second installing point, acquiring at the first installing point a first image including the object to be measured and an auxiliary first image which has a narrow intersection angle with respect to the first image by a rightward or leftward tilt of the monopod with respect, to the object to be measured from a first image acquisition state, performing the first photogrammetry with a narrow intersection angle based on the first image, the auxiliary first image, the known distance and a tilt detected by the attitude detector, acquiring at the second installing point a second image including the object to be measured and an auxiliary second image which has a narrow intersection angle with respect to the second image by a rightward or leftward tilt of the monopod with respect to the object to be measured from a second image acquisition state, performing the second photogrammetry with a narrow intersection angle based on the second image, the auxiliary second image, the known distance and a tilt detected by the attitude detector, extracting the corresponding points common to the first image and second image based on the rough three-dimensional positions acquired by the first photogrammetry and the second photogrammetry, performing the matching of the first image and the second image based on the extracted corresponding points and performing the third photogrammetry with a wide intersection angle.

Furthermore, in the photometric method according to the present invention, each of the first image, the auxiliary first image, the second image and the auxiliary second image is a vertical image corrected based on a result obtained by the attitude detector.

According to the present invention, there is provided a surveying instrument including a monopod which is movable and sequentially installed at least at a first installing point and a second installing point which is a predetermined position with respect to the first installing point and a surveying instrument main body which is provided at a known distance from a lower end of the monopod and at a known angle with respect to an axis of the monopod and has a reference optical axis, wherein the surveying instrument main body comprises a distance measuring unit configured to irradiate a distance measuring light, receive a reflected distance measuring light and measure a distance to an object to be measured, a measuring direction image pickup module which includes the object to be measured and is configured to acquire an observation image in a predetermined relationship with the reference optical axis, an attitude detector is configured to detect a tilt of the surveying instrument main body with respect to the horizontal or the vertical and an arithmetic control module configured to make the distance measuring unit perform a distance measurement of a predetermined measuring point and make the measuring direction image pickup module acquire an image of the object to be measured, and wherein the arithmetic control module is configured to extract each common corresponding point from a first image acquired at the first installing point and a second image acquired at the second installing point, perform the matching of the first image and the second image based on a distance measurement value of the corresponding point or a vicinity of the corresponding point in the first image acquired by the distance measuring unit and a distance measurement value of the corresponding point or the vicinity of the corresponding point in the second image acquired by the distance measuring unit, and make a measurement of a positional relationship of the object to be measured with respect to the first installing point and the second installing point based on a matching image. As a result, the highly accurate photogrammetry can be performed without producing a mismatch even if the intersection angle is large.

Further, according to the present invention, there is provided a photogrammetric method comprising: having a monopod installed at an installing point, a surveying instrument main body which is provided at a known distance from a lower end of the monopod and at a known position with respect to an axis of the monopod and has a reference optical axis, a measuring direction image pickup module which is provided to the surveying instrument main body, includes an object to be measured and is configured to acquire an observation image in a predetermined relationship with the reference optical axis, an attitude detector is configured to detect a tilt of the surveying instrument main body with respect to the horizontal or the vertical, and an arithmetic control module is configured to perform the acquisition of an image of the object to be measured, sequentially installing the monopod at least at a first installing point and a second installing point, acquiring at the first installing point a first image including the object to be measured and an auxiliary first image which has a narrow intersection angle with respect to the first image by a rightward or leftward tilt of the monopod with respect to the object to be measured from a first image acquisition state, performing the first photogrammetry with a narrow intersection angle based on the first image, the auxiliary first image, the known distance and a tilt detected by the attitude detector, acquiring at the second installing point a second image including the object to be measured and an auxiliary second image which has a narrow intersection angle with respect to the second image by a rightward or leftward tilt of the monopod with respect to the object to be measured from a second image acquisition state, performing the second photogrammetry with a narrow intersection angle based on the second image, the auxiliary second image, the known distance and a tilt detected by the attitude detector, extracting the corresponding points common to the first image and second image based on the rough three-dimensional positions acquired by the first photogrammetry and the second photogrammetry, performing the matching of the first image and the second image based on the extracted corresponding points and performing the third photogrammetry with a wide intersection angle. As a result, the photogrammetry can be performed without producing a mismatch even if the intersection angle is large, a measurement accuracy can be improved, a measurement mechanism using the distance measuring light can be omitted, and an instrument cost can be reduced.

DETAILED DESCRIPTION OF THE PREFERRED EMBODIMENT

A description will be given on an embodiment of the present invention by referring to the attached drawings.

Figure 1:
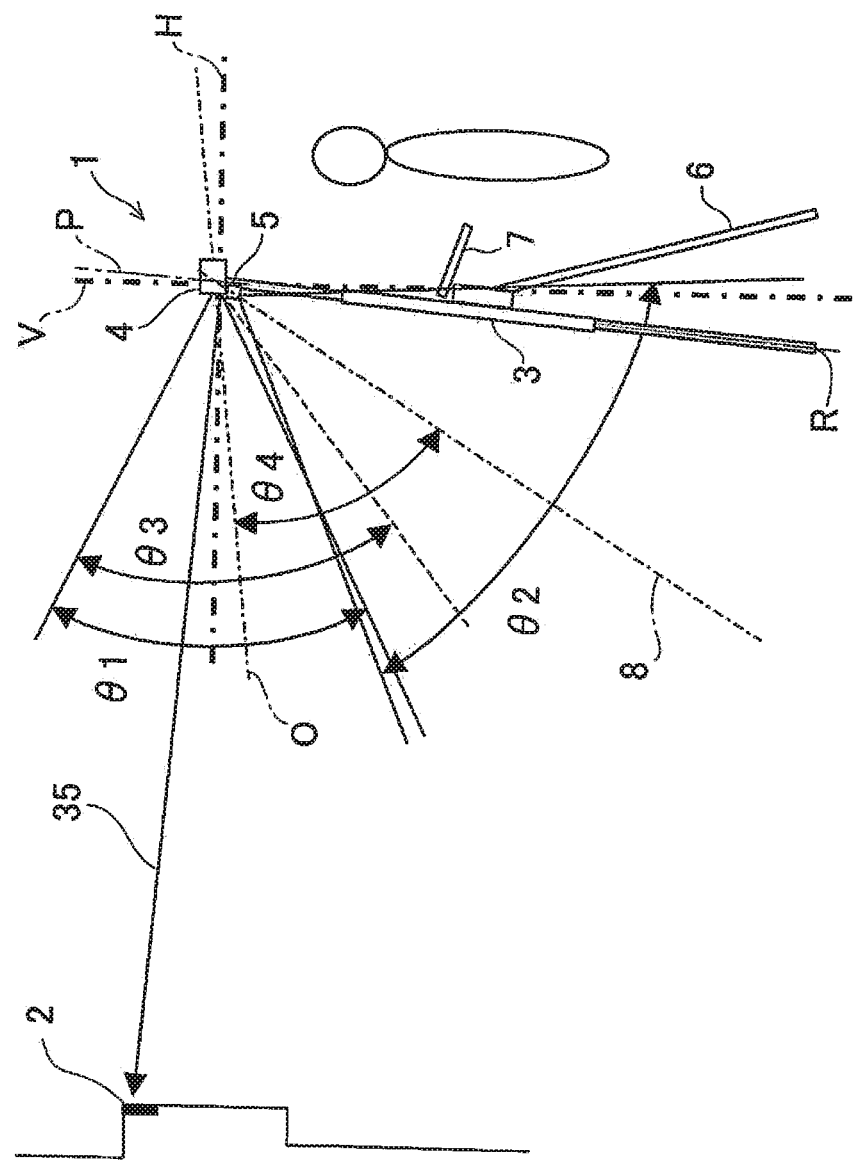
FIG. 1 is a schematical drawing to show a first embodiment of the present invention.

FIG. 1 is a drawing to show an outline of the first embodiment of the present invention, and in FIG. 1, a reference numeral 1 denotes a surveying instrument of a monopole support type and a reference numeral 2 denotes an object to be measured.

The surveying instrument 1 has mainly a monopod (monopole) 3, a surveying instrument main body 4 provided on an upper end of the monopod 3 and an operation panel 7, and the operation panel 7 is provided at an appropriate position of the monopod 3, at a position where a measurement worker can perform an operation easily in a standing attitude, for instance.

The operation panel 7 may be provided in a fixed manner with respect to the monopod 3 or may be attachable and detachable. It may be so configured that the operation panel 7 is capable of operating in a state where the operation panel 7 is mounted on the monopod 3. Further, it may be so configured that the operation panel 7 is separated from the monopod 3, and in a state of a single body, the operation panel 7 can be operated. The operation panel 7 and the surveying instrument main body 4 are capable of a data communication via various types of a communication means such as a wired and a wireless.

Further, a single auxiliary leg 6 is foldably mounted at a position below the operation panel 7 of the monopod 3.

A lower end of the monopod 3 has a sharp tip, and the lower end is installed at a reference point "R" (point which becomes a reference of a measurement). Further, a distance from the lower end of the monopod 3 to a machine center of the surveying instrument main body 4 (point which becomes a reference of the measurement in the surveying instrument main body 4) is already-known.

An optical system of the surveying instrument main body 4 has a reference optical axis "O" approximately extending in a horizontal direction, and the reference optical axis "O" is set so as to tilt downward by a predetermined angle with respect to a line orthogonal to an axis "P" of the monopod 3. Therefore, when the monopod 3 is set vertically, the reference optical axis "O" is tilted downward by the predetermined angle with respect to the horizontal.

The auxiliary leg 6 is foldably connected to the monopod 3 at an upper end of the auxiliary leg 6, and in a state where the auxiliary leg 6 is folded, the auxiliary leg 6 adheres closely to the monopod 3, and a lock mechanism, which holds the close contact state, is provided. Alternatively, in a simplified manner, a band (not shown) bundling the monopod 3 and the auxiliary leg 6 may be provided. In a state where the auxiliary leg 6 is folded, the worker can grip the monopod 3 and can perform a measurement.

The auxiliary leg 6 can rotate around the upper end at a predetermined angle and can be separated away from the monopod 3, and can be fixed at a separated position. When the auxiliary leg 6 is used, the surveying instrument main body 4 is supported by two points, which are the auxiliary leg 6 and the monopod 3, a support of the surveying instrument main body 4 is stabilized, and a stability of the measurement by the surveying instrument main body 4 is improved. It is to be noted that although a description has been given on a case where the number of the auxiliary leg 6 is one, the auxiliary leg 6 may be two. In this case, the monopod 3 can stand alone.

The surveying instrument main body 4 has a distance measuring unit 24 as an electronic distance meter (to be described later) and a measuring direction image pickup module 21 (to be described later), and further a lower image pickup module 5, which is an external image pickup module, is provided on the surveying instrument main body 4. A reference optical axis of an optical system of the distance measuring unit 24 is the reference optical axis "O". An optical axis of the measuring direction image pickup module 21 (hereinafter a first image pickup optical axis 61) is tilted upward by a predetermined angle (6°, for instance) with respect to the reference optical axis "O", and a distance and a positional relationship between the optical axis of the measuring direction image pickup module 21 and an optical axis of the distance measuring unit 24 are already-known. The distance measuring unit 24 and the measuring direction image pickup module 21 are accommodated in a casing of the surveying instrument main body 4.

The lower image pickup module 5 has an image pickup element such as a CCD and a CMOS, and an image pickup device capable of acquiring a digital image is used as the lower image pickup module 5. Further, a position of a pixel in the image pickup element can be detected with reference to a lower image pickup optical axis of the lower image pickup module 5 (hereinafter a second image pickup optical axis 8). As the lower image pickup module 5, a commercial digital camera can be used, for instance.

The lower image pickup module 5 is fixed to the casing of the surveying instrument main body 4, and the lower image pickup module 5 (that is, an image forming position of the lower image pickup module 5) is provided at a known position (distance) with respect to the machine center of the surveying instrument main body 4. The second image pickup optical axis 8 is directed downward and set at the predetermined known angle (θ4) with respect to the reference optical axis "O", and the second image pickup optical axis 8 and the reference optical axis "O" have a known relationship (distance). It is to be noted that the lower image pickup module 5 may be accommodated in the casing and may be integrated with the surveying instrument main body 4.

A field angle of the measuring direction image pickup module 21 is "θ1", the field angle of the lower image pickup module 5 is "θ2", and "θ1" and "θ2" may be equal or may be different. Further, the field angle of the measuring direction image pickup module 21 and the field angle of the lower image pickup module 5 do not have to overlap each other, but they preferably overlap each other by a predetermined amount. Further, the field angle of the lower image pickup module 5 and the direction of the second image pickup optical axis 8 are set so that the lower end of the monopod 3 is included in an image. It is to be noted that a reference character "θ3" denotes a scan range of the surveying instrument main body 4.

A description will be given on an outline configuration of the surveying instrument main body 4 by referring to FIG. 2.

The surveying instrument main body 4 includes a distance measuring light projecting module 11, a light receiving module 12, a distance measurement calculating module 13, an arithmetic control module 14, a first storage module 15, an image pickup control module 16, an image processing module 17, a first communication module 18, an optical axis deflector 19, an attitude detector 20, the measuring direction image pickup module 21, projecting direction detecting module 22 and a motor driver 23, and they are accommodated in a casing 25 and integrated. It is to be noted that the distance measuring light projecting module 11, the light receiving module 12, the distance measurement calculating module 13, the optical axis deflector 19 and the like make up a distance measuring unit 24.

The distance measuring light projecting module 11 has a projection optical axis 26, and a light emitter 27 such as a laser diode (LD), for instance, as a distance measuring light source is provided on the projection optical axis 26. Further, a projecting lens 28 is provided on the projection optical axis 26. Furthermore, the projection optical axis 26 is deflected so as to coincide with a light receiving optical axis 31 (to be described later) by a first reflection mirror 29 as a deflecting optical component provided on the projection optical axis 26 and a second reflection mirror 32 as a deflecting optical component provided on the light receiving optical axis 31. The first reflection mirror 29 and the second reflection mirror 32 make up a projection optical axis deflector.

A CPU specialized for this instrument or a general-purpose CPU is used as the distance measurement calculating module 13, and the distance measurement calculating module 13 executes a program (to be described later) stored in the first storage module 15 and performs a distance measurement or a control. It is to be noted that a part of the functions of the arithmetic control module 14 may be assigned as the distance measurement calculating module 13. The distance measurement calculating module 13 makes the light emitter 27 emit, and the light emitter 27 emits a laser beam. The distance measuring light projecting module 11 projects the laser beam emitted from the light emitter 27 as a distance measuring light 33. It is to be noted that, as the laser beam, any one of a continuous light or a pulsed light or an intermittent modulated light disclosed in Japanese Patent Application Publication No. 2016-161411 may be used. Hereinafter the continuous light and the pulsed light are generically referred to as the pulsed light.

A description will be given on the light receiving module 12. A reflected distance measuring light 34 from an object to be measured 2 enters into the light receiving module 12. The light receiving module 12 has the light receiving optical axis 31, and the projection optical axis 26 deflected by the first reflection mirror 29 and the second reflection mirror 32 coincides with the light receiving optical axis 31. It is to be noted that an axis of a state where the projection optical axis 26 coincides with the light receiving optical axis 31 is a distance measuring optical axis 35.

The optical axis deflector 19 is disposed on the reference optical axis "O". A straight optical axis transmitted through a center of the optical axis deflector 19 is the reference optical axis "O". The reference optical axis "O" coincides with the projection optical axis 26, the light receiving optical axis 31 or the distance measuring optical axis 35 when they are not deflected by the optical axis deflector 19.

The reflected distance measuring light 31 is transmitted through the optical axis deflector 19 and is incident onto the light receiving optical axis 31. Further, a focusing lens 38 is disposed on the light receiving optical axis 31. Further, a photodetector 39 such as a photodiode (PD) or an avalanche photodiode (APD) is provided on the light receiving optical axis 31. The focusing lens 38 focuses the reflected distance measuring light 34 on the photodetector 39. The photodetector 39 receives the reflected distance measuring light 34 and produces a photodetecting signal. The photodetecting signal is inputted into the distance measurement calculating module 13, and the distance measurement calculating module 13 calculates a round-trip time of the distance measuring light based on the photodetecting signal and performs the distance measurement to the object to be measured 2 based on the round-trip time and the light velocity. Further, the photodetecting signal includes an information of a light receiving intensity of when the reflected distance measuring light 34 is received, and the distance measurement calculating module 13 calculates a reflection intensity from the object to be measured 2.

The first communication module 18 transmits image data acquired by the measuring direction image pickup module 21, image data processed by the image processing module 17 and distance measurement data acquired by the distance measuring unit 24 to the operation panel 7 and receives an operation command from the operation panel 7. The first communication module 18 performs the data communication with a second communication module 67 which will be described later by a required communication means such as a wired and a wireless.

In the first storage module 15, various types of programs are stored. These programs include: an image pickup control program, an image processing program, a distance measurement program, a display program, a communication program, an operation command creating program, a tilt angle calculation program for calculating a tilt angle and a tilting direction of the monopod 3 based on an attitude detection result from the attitude detector 20 and for calculating a vertical component of the tilt angle (tilt angle of the monopod 3 in a front-and-rear direction with respect to the object to be measured 2) and a horizontal component of the tilt angle (tilt angle of the monopod 3 in a left-and-right direction with respect to the object to be measured 2), a correction program for correcting a direction of an image acquired based on the calculated tilt, a measurement program for carrying out the distance measurement, a deflection control program for controlling a deflecting operation of the optical axis deflector 19, a matching program for associating the images acquired at least at two positions with each other, a calculation program for calculating a distance (a positional relationship) between at least two photographing positions, a surveying program for carrying out the photogrammetry based on the at least two images associated with each other, a calculation program for executing the various types of calculations and other programs. Further, in the first storage module 15, various types of data, such as the distance measurement data, the angle measurement data, and the image data are stored.

According to an operating state of the surveying instrument main body 4, the arithmetic control module 14 develops and executes the various types of programs, carries out a control of the distance measuring light projecting module 11, a control of the light receiving module 12, a control of the distance measurement calculating module 13, a control of the measuring direction image pickup module 21 and the like, and performs the distance measurement by the surveying instrument main body 4. It is to be noted that a CPU specialized for this instrument or a general-purpose CPU is used as the arithmetic control module 14. Further a part of the functions of the arithmetic control module 14 may be assigned as the distance measurement calculating module 13.

Further, as the first storage module 15, various types of storage devices are used. These storage devices include: an HDD as a magnetic storage device, a CD or a DVD as an optical storage device, a memory card as a semiconductor storage device, a USB and other storage devices are used. The first storage module 15 may be attachable and detachable with respect to the casing 25. Alternatively, the storage module 15 may enable transmitting the data to an external storage device or an external data processing device via a desired communicating means.

A detailed description will be given on the optical axis deflector 19.

The optical axis deflector 19 is constituted by a pair of optical prisms 41 and 42. The optical prisms 41 and 42 have a disk shape with the same diameter, respectively, are arranged concentrically on the distance measuring optical axis 35 while crossing the distance measuring optical axis 35 at a right angle, and are arranged in parallel at a predetermined interval. The optical prism 41 is formed from an optical glass and has three triangular prisms arranged in parallel. Similarly, the optical prism 42 is also formed from the optical glass and has three triangular prisms arranged in parallel. It is to be noted that the triangular prisms which constitute the optical prism 41 and the triangular prisms which constitute the optical prism 42 all have optical characteristics of the same deflection angle.

A width and a shape of each of the triangular prisms may be the same or may be different. It is to be noted that the widths of the triangular prisms positioned at a center are larger than a beam diameter of the distance measuring light 33, and the distance measuring light 33 is adapted to transmit only the triangular prisms positioned at the center. The triangular prisms positioned other than at the center may be constituted by a plurality of small triangular prisms (a Fresnel prism).

Further, the triangular prisms at the center may be made of an optical glass, and the triangular prisms other than at the center may be made of an optical plastic. That is because a distance from the optical axis deflector 19 to the object to be measured 2 is large, optical characteristics of the triangular prisms at the center require an accuracy, but on the other hand, a distance from each triangular prism other than at the center to the photodetector 39 is small, and highly accurate optical characteristics are not required.

A central part of the optical axis deflector 19 (triangular prisms at the center) is a distance measuring light deflector which is a first optical axis deflector through which the distance measuring light 33 is transmitted and is projected. A portion excluding the central part of the optical axis deflector 19 (both end portions of the triangular prisms at the center and the triangular prisms other than at the center) is a reflected distance measuring light deflector which is a second optical axis deflector through which the reflected distance measuring light 34 is transmitted and enters.

The optical prisms 41 and 42 are arranged rotatably individually and independently around the reference optical axis "O", respectively. The optical prisms 41 and 42 are controlled independently by the arithmetic control module 14 regarding a rotating direction, a rotation amount and a rotating speed. Thereby, the optical prisms 41 and 42 deflect the projection optical axis 26 of the projected measuring light 33 in an arbitrary direction and also deflect the light receiving optical axis 31 of the received reflected distance measuring light 34 in parallel with the projection optical axis 26.

Further, the optical prisms 41 and 42 are continuously driven and continuously deflected while continuously irradiating the distance measuring light 33. Thereby, the distance measuring light 33 can be scanned in a predetermined pattern.

Outer shapes of the optical prisms 41 and 42 are circular around the distance measuring optical axis 35 (reference optical axis "O"), respectively, and diameters of the optical prisms 41 and 12 are set so that a sufficient light amount can be obtained by considering a spread of the reflected distance measuring light 34.

A ring gear 45 is fitted on an outer periphery of the optical prism 41, and a ring gear 46 is fitted on an outer periphery of the optical prism 42.

A driving gear 47 is meshed with the ring gear 45, and the driving gear 47 is fixed to an output shaft of a motor 48. Similarly, a driving gear 49 is meshed with the ring gear 46, and the driving gear 49 is fixed to an output shaft of a motor 50. The motors 48 and 50 are electrically connected to the motor driver 23.

As the motors 48 and 50, motors which are capable of detecting the rotation angle are used, or motors which rotate corresponding to a driving input value such as a pulse motor, for instance, are used. Alternatively, a rotation angle detector which detects rotation amounts (rotation angles) of the motors such as an encoder, for instance, may be used, and the rotation amounts of the motors 48 and 50 may be detected by the rotation angle detector. The rotation amounts of the motors 48 and 50 are detected, respectively, and the motors 48 and 50 are individually controlled by the motor driver 23.

Further, rotation angles of the prisms 41 and 42 are detected via the rotation amounts of the motors 48 and 50, that is, rotation amounts of the driving gears 47 and 49. It is to be noted that the encoder may be attached directly to the ring gears 45 and 46, respectively, so that the rotation angles of the ring gears 45 and 46 are directly detected by the encoder.

Here, a deflection angle of the optical axis deflector 19 is smaller than the rotation angles of the optical prisms 41 and 42 (for instance, a rotation angle for achieving the deflection angle ±10° is ±40°), and the optical axis deflector 19 can deflect the distance measuring light 33 highly accurately.

The driving gears 47 and 49 and the motors 48 and 50 are provided at positions not interfering with the distance measuring light projecting module 11 such as at lower positions of the ring gears 45 and 46, for instance.

The projecting lens 28, the first reflection mirror 29, the second reflection mirror 32, the distance measuring light deflector and the like make up a projection optical system. Further, the reflected distance measuring light deflector, the focusing lens 38 and the like make up a light receiving optical system.

The distance measurement calculating module 13 controls the light emitter 27 and makes the light emitter 27 pulse-emit or burst-emit (intermittently emit) the laser beam as the distance measuring light 33. The projection optical axis 26 (that is, the distance measuring optical axis 35) is deflected by the distance measuring light deflector so that the distance measuring light 33 is directed toward the object to be measured 2. The distance measurement is performed in a state where the distance measuring optical axis 35 sights the object to be measured 2.

The reflected distance measuring light 34 as reflected from the object to be measured 2 is incident through the reflected distance measuring light deflector and the focusing lens 38, and the reflected distance measuring light 34 is received by the photodetector 39. The photodetector 39 sends out the photodetecting signal to the distance measurement calculating module 13, and the distance measurement calculating module 13 performs the distance measurement of a measuring point (point irradiated by the distance measuring light) for each pulsed light based on the photodetecting signal from the photodetector 39, and the distance measurement data is stored in the first storage module 15.

The projecting direction detecting module 22 counts driving pulses inputted into the motors 48 and 50 and detects the rotation angles of the motors 48 and 50. Alternatively, the projecting direction detecting module 22 detects the rotation angles of the motors 48 and 50 based on a signal from the encoder. Further, the projecting direction detecting module 22 calculates rotational positions of the optical prisms 41 and 42 based on the rotation angles of the motors 18 and 50.

Further, the projecting direction detecting module 22 calculates a deflection angle and a projecting direction (deflecting direction) of the distance measuring light 33 with respect to the reference optical axis "O" for each pulsed light based on refractive indexes of the optical prisms 41 and 42, the rotational position of when the optical prisms 41 and 42 are integrated and a relative rotation angle between the both optical prisms 41 and 42 in real time. A calculation result (angle measurement result) is associated with the distance measurement result and is inputted into the arithmetic control module 14. It is to be noted that in a case where the distance measuring light 33 is burst-emitted, the distance measurement is performed for each intermittent distance measuring light.

The arithmetic control module 14 executes a program stored in the first storage module 15 and executes various types of calculations, a processing such as a creation of three-dimensional data and various types of controls. By controlling the rotating directions and the rotating speeds of the motors 46 and 50 and a rotation ratio between the motors 48 and 50, the arithmetic control module 14 controls a relative rotation and an entire rotation of the optical prisms 41 and 42 and controls a deflecting action by the optical axis deflector 19. Further, the arithmetic control module 14 calculates a horizontal angle and a vertical angle of the measuring point with respect to the reference optical axis "O" based on the deflection angle and the projecting direction of the distance measuring light 33. Further, the arithmetic control module 14 associates the horizontal angle and the vertical angle regarding the measuring point with the distance measurement data and can acquire three-dimensional data of the measuring point. Thus, the surveying instrument main body 4 functions as a total station.

Further, a scan can be performed in an arbitrary pattern within a range of a maximum deflection angle of the optical axis deflector 19 as described later.

Next, a description will be given on the attitude detector 20. The attitude detector 20 detects a tilt angle with respect to the horizontal or the vertical of the measuring instrument main body 4, and the detection result is inputted to the arithmetic control module 14. It is to be noted that as the attitude detector 20, an attitude detector disclosed in Japanese Patent Application Publication No. 2016-151423 can be used.

The attitude detector 20 will be described in brief. The attitude detector 20 has a frame 54. The frame 51 is fixed to the casing 25 or fixed to a structural component and is integrated with the surveying instrument main body 4.

A sensor block 55 is mounted on the frame 54 via a gimbal. The sensor block 55 is rotatable by 360° or over 360° in two directions around two axes crossing each other at a right angle, respectively.

A first tilt sensor 56 and a second tilt sensor 57 are mounted on the sensor block 55. The first tilt sensor 56 is a sensor which detects the horizontal with high accuracy, for instance, a tilt detector which makes a detection light enter a horizontal liquid surface, and detects the horizontal according to a change of a reflection angle of a reflected light or an air bubble tube which detects the tilt according to a positional change of sealed air bubbles. Further, the second tilt sensor 57 is a sensor which detects a tilt change with high responsiveness, for instance an acceleration sensor.

Each relative rotation angle of the two axes of the sensor block 55 with respect to the frame 54 are configured to be detected by encoders 58 and 59, respectively.

Further, motors (not shown) which rotate the sensor block 55 in order to maintain the sensor block 55 horizontally are provided in relation with the two axes, respectively. The motors are controlled by the arithmetic control module 14 so that the sensor block 55 is maintained horizontally based on detection results from the first tilt sensor 56 and the second tilt sensor 57.

In a case where the sensor block 55 is tilted (in a case where the surveying instrument main body 4 is tilted), the relative rotation angle of each axial direction of the frame 54 with respect to the sensor block 55 (horizontal) is detected by the encoders 58 and 59, respectively. Based on the detection results of the encoders 58 and 59, the tilt angles of the surveying instrument main body 4 with respect to the two axes are detected, and the tilting direction of the surveying instrument main body 4 is detected by synthesizing the tilts of the two axes.

The sensor block 55 is rotatable by 360° or over 360° with respect to the two axes and hence, whatever the attitude detector 20 takes any attitude or even if the attitude detector 20 is inverted upside down, for instance, the attitude detector 20 is capable of an attitude detection (the tilt angle and the tilting direction with respect to the horizontal) in all the directions.

In the attitude detection, in a case where high responsiveness is required, the attitude detection and an attitude control are performed based on the detection result of the second tilt sensor 57, but the second tilt sensor 57 has a detection accuracy poorer than the first tilt sensor 56 in general.

The attitude detector 20 includes the first tilt sensor 56 with high accuracy and the second tilt sensor 57 with high responsiveness. Thereby, it is possible to perform the attitude control based on the detection result of the second tilt sensor 57 and further, to perform the attitude detection with high accuracy by the first tilt sensor 56.

The detection result of the second tilt sensor 57 can be calibrated based on the detection result of the first tilt sensor 56. That is, if a deviation is caused between values of the encoders 58 and 59 of when the first tilt sensor 56 detects the horizontal, that is, an actual tilt angle and the tilt angle detected by the second tilt sensor 57, the tilt angle of the second tilt sensor 57 can be calibrated based on the deviation.

Therefore, if the relationship between a tilt angle detected by the second tilt sensor 57 and a tilt angle, which is obtained based on the horizontal detection by the first tilt sensor 56 and the detection results of the encoders 58 and 59, is obtained in advance, the arithmetic control module 14 can calibrate the tilt angle detected by the second tilt sensor 57, and an accuracy of the attitude detection with high responsiveness by the second tilt sensor 57 can be improved based on this calibration. In a state where there is a small environmental change (temperature or the like), the tilt detection may be performed based on the detection result of the second tilt sensor 57 and a correction value.

The arithmetic control module 14 controls the motors based on the signal from the second tilt sensor 57 when a tilt fluctuation is large and when the tilt change is rapid. Further, the arithmetic control module 14 controls the motors based on the signal from the first tilt sensor 56 when the tilt fluctuation is small and when the tilt change is mild, that is, in a state where the first tilt sensor 56 is capable of following up. It is to be noted that by calibrating the tilt angle detected by the second tilt sensor 57 at ail times, the attitude detection by the attitude detector 20 may be performed based on the detection result from the second tilt sensor 57.

In the first storage module 15, comparison data indicating a comparison result between the detection result of the first tilt sensor 56 and the detection result of the second tilt sensor 57 is stored. The detection result by the second tilt sensor 57 is calibrated based on the signal from the first tilt sensor 56. By this calibration, the detection result by the second tilt sensor 57 can be improved to the detection accuracy of the first tilt sensor 56. Thus, in the attitude detection by the attitude detector 20, high responsiveness can be realized while high accuracy is maintained.

The arithmetic control module 14 calculates an inclination angle of the monopod 3 in the front-and-rear direction (inclination angle in an approaching and separating direction with respect to the object to be measured 2) and an inclination angle of the monopod 3 in the left-and-right direction based on the detection result of the attitude detector 20. The inclination angle in the front-and-rear direction appears as a tilt angle of the reference optical axis "O" with respect to the horizontal, and the inclination angle in the left-and-right direction appears as an inclination (rotation) of an image acquired by the measuring direction image pickup module 21.

The arithmetic control module 14 calculates a tilt angle of the distance measuring optical axis 35 with respect to the horizontal based on the inclination angles and the deflection angle by the optical-axis deflector 19. Further, based on the inclination of the image, an inclination of an image displayed on the display module 68 (to be described later) is corrected and displayed as a vertical image.

The measuring direction image pickup module 21 has the first image pickup optical axis 61 in parallel with the reference optical axis "O" of the surveying instrument main body 4 and an image pickup lens 62 arranged on the first image pickup optical axis 61. The measuring direction image pickup module 21 is a camera having a field angle 50° to 60°, for instance, substantially equal to a maximum deflection angle "θ/2" (±30°, for instance) of the optical prisms 41 and 42. The relationship among the first image pickup optical axis 61, the projection optical axis 26 and the reference optical axis "O" is already-known, and the distance between each of the optical axes has a known value.

Further, the measuring direction image pickup module 21 can acquire a still image, a continuous image or a video image in real time. The image acquired by the measuring direction image pickup module 21 is transmitted to the operation panel 7. In the present embodiment, the image is displayed on the display module 68 of the operation panel 7 as an observation image which is a still image, and the worker can observe the observation image displayed on the display module 68 and carry out a measurement work. A center of the observation image coincides with the first image pickup optical axis 61, and the reference optical axis "O" is positioned at a position which deviates from the center of the observation image at a predetermined field angle based on a known relationship between the reference optical axis "O" and the first image pickup optical axis 61.

The image pickup control module 16 controls an image pickup of the measuring direction image pickup module 21. In a case where the measuring direction image pickup module 21 picks up the video image or the continuous image, the image pickup control module 16 synchronizes a timing of acquiring a frame image constituting the video image or the continuous image with a timing of scanning and of performing the distance measurement by the surveying instrument main body 4 (timing of measuring a distance per a pulsed laser beam). Further, in a case where the measuring direction image pickup module 21 acquires the still image, the image pickup control module 16 synchronize a timing of acquiring the still image with the timing of scanning by the surveying instrument main body 4. The arithmetic control module 14 also performs associating the image with the measurement data (distance measurement data, angle measurement data). Further, the image pickup control module 16 performs a synchronization control of the image pickup timing between the measuring direction image pickup module 21 and the lower image pickup module 5 via the first communication module 18 and a second communication module 67 (see FIG. 3). It is to be noted that a part of the functions of the arithmetic control module 14 may be assigned as the image pickup control module 16.

An image pickup element 63 of the measuring direction image pickup module 21 is a COD or a CMOS sensor which is an aggregate of pixels, and each pixel can specify a position on the image pickup element 63. Each pixel has pixel coordinates in a coordinate system with the first image pickup optical axis 61 as an origin, for instance. The photodetecting signal from each pixel includes an information of the pixel coordinates. Therefore, a position of each pixel on the image pickup element 63 is specified by the pixel coordinates included in the photodetecting signal. Further, since the relationship (distance) between the first image pickup optical axis 61 and the reference optical axis "O" is already-known, a mutual association between the measuring position by the distance measuring unit 24 and the position (pixel) on the image pickup element 63 can be made. An image signal outputted from the image pickup element 63 is inputted into the image processing module 17 via the image pickup control module 16.

A description will be given on a deflecting action and a scanning action of the optical axis deflector 19.

In a state where the triangular prisms of the optical prism 41 and the triangular prisms of the optical prism 42 are positioned in the same direction, a maximum deflection angle (for instance, 30°) can be obtained. In a state where either one of the optical prisms 41 and 42 is positioned in a position where either one of the optical prisms is rotated by 180° with respect to the other of the optical prism, mutual optical actions of the optical prisms 41 and 42 are offset, and the deflection angle becomes 0°. In this state, a minimum deflection angle can be obtained. Therefore, the optical axis of the laser beam (the distance measuring optical axis 35) projected and received via the optical prisms 41 and 42 coincides with the reference optical axis "O".

The distance measuring light 33 is emitted from the light emitter 27, and the distance measuring light 33 is made to parallel fluxes by the projecting lens 28. The distance measuring light 33 is transmitted through the distance measuring light deflector and is projected toward the object to be measured 2. Here, since the distance measuring light 33 is transmitted through the distance measuring light deflector, the distance measuring light 33 is deflected in a required direction by the triangular prisms at the center and projected.

Here, the distance measuring light 33 is all transmitted through the triangular prisms at the center and affected by an optical action of the triangular prisms at the center, but since the optical action is provided from a single optical component, a luminous flux is not disordered, and a deflection accuracy is high. Further, since the optical glass is used as the triangular prisms at the center, the deflection accuracy can be further increased.

The reflected distance measuring light 34 reflected by the object to be measured 2 transmits through the reflected distance measuring light deflector and enters and is focused on the photodetector 39 by the focusing lens 38.

Since the reflected distance measuring light 34 is transmitted through the reflected distance measuring light deflector, an optical axis of the reflected distance measuring light 34 is deflected by the triangular prisms other than at the center so as to coincide with the light receiving optical axis 31.

The deflecting direction and the deflection angle of the distance measuring light 33 as projected can be arbitrarily changed by the combination of the rotational positions of the optical prism 41 and the optical prism 42.

Figure 2:
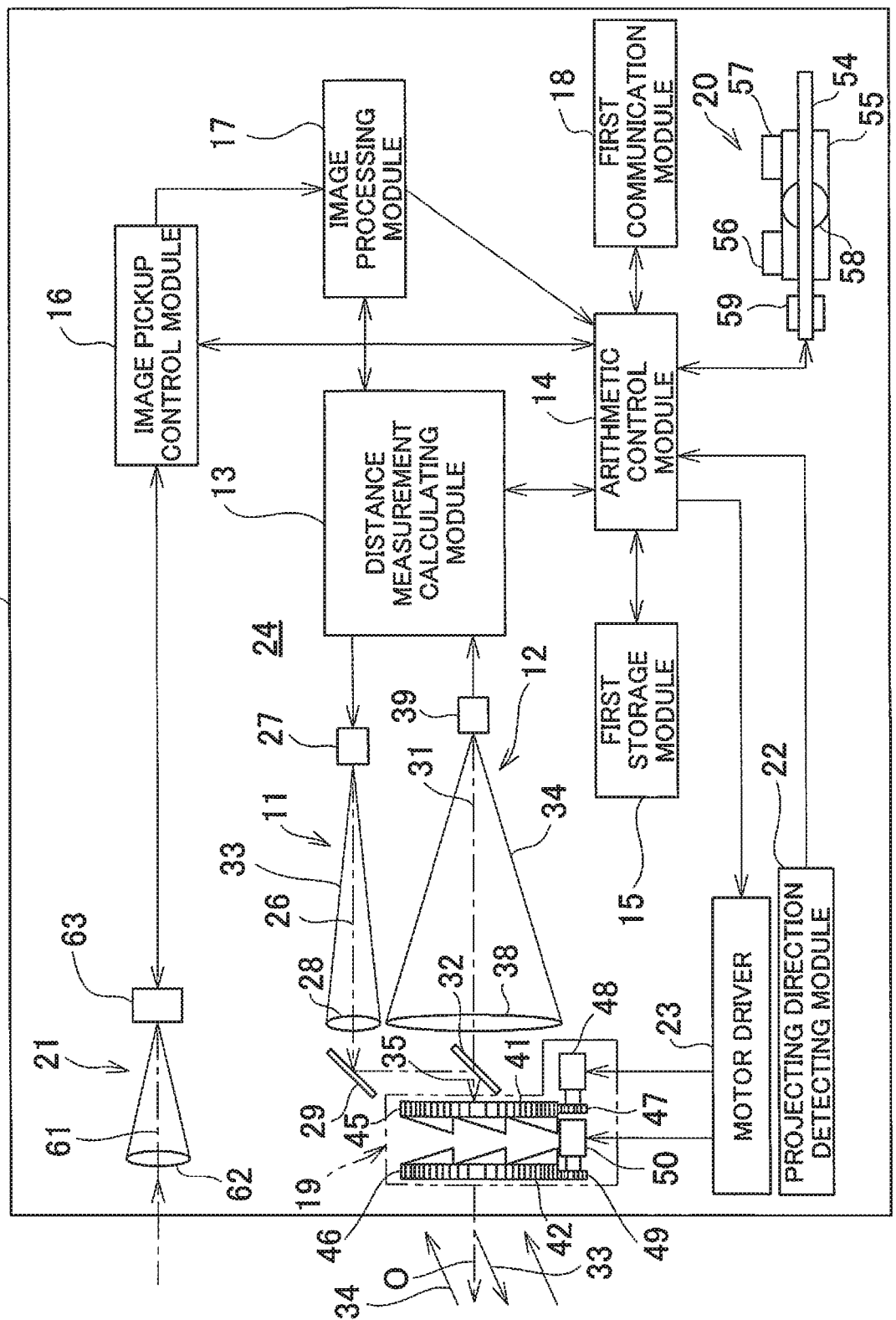
FIG. 2 is a schematical block diagram to show a surveying instrument main body according to the first embodiment of the present invention.

Further, when the optical prism 41 and the optical prism 42 are integrally rotated by the motors 48 and 50 in a state where the positional relationship between the optical prism 41 and the optical prism 42 is fixed (in a state where the deflection angle as obtained by the optical prism 41 and the optical prism 42 is fixed), a locus drawn by the distance measuring light 33 as transmitted through the distance measuring light deflector becomes a circle around the reference optical axis "O" (see FIG. 2).

Therefore, if the optical axis deflector 19 is rotated while the laser beam is emitted from the light emitter 27, the distance measuring light 33 can be scanned with a circular locus. It is needless to say that the reflected distance measuring light deflector is integrally rotated with the distance measuring light deflector.

Assuming that the deflecting direction of the optical axis deflected by the optical prism 41 is a deflection "A" and the deflecting direction of the optical axis deflected by the optical prism 42 is a deflection "B", the deflection of the optical axis by the optical prisms 41 and 42 becomes a synthetic deflection "C" as an angular difference "θ" between the optical prisms 41 and 42.

Therefore, when the optical prism 41 and the optical prism 42 are reversely rotated at an equal speed, the distance measuring light 33 is reciprocally scanned with a linear locus in a direction of the synthetic deflection "C".

Further, when the optical prism 42 is rotated at a rotating speed lower than a rotating speed of the optical prism 41, the distance measuring light 33 is rotated while the angular difference θ is gradually increased. Therefore, a scan locus of the distance measuring light 33 becomes spiral. Further, by individually controlling the rotating directions and the rotating speeds of the optical prism 41 and the optical prism 42, various two-dimensional scan patterns of the scan locus of the distance measuring light 33 such as a trochoid (flower petal) around the reference optical axis "O" can be obtained.

A description will be given on the lower image pickup module 5.

The lower image pickup module 5 is electrically connected to the surveying instrument main body 4, and image data acquired by the lower image pickup module 5 is inputted into the surveying instrument main body 4.

An image pickup of the lower image pickup module 5 is synchronously controlled with the image pickup of the measuring direction image pickup module 21 and the distance measurement of the distance measuring unit 24 by the image pickup control module 16. The lower image pickup module 5 is provided at an already-known position with respect to the machine center of the surveying instrument main body 4, and the distance between the lower image pickup module 5 and the lower end of the monopod 3 is also already-known.

Further, regarding the second image pickup optical axis 8 of the lower image pickup module 5, there is a known relationship in an angle between the second image pickup optical axis 8 and the reference optical axis "O" and in a position of an intersection between the reference optical axis "O" and the second image pickup optical axis 8, and the image data acquired by the lower image pickup module 5 is associated with the image as acquired by the measuring direction image pickup module 21 and the distance measurement data as measured by the distance measuring unit 24 and stored in the first storage module 15 by the arithmetic control module 14.

Figure 3:
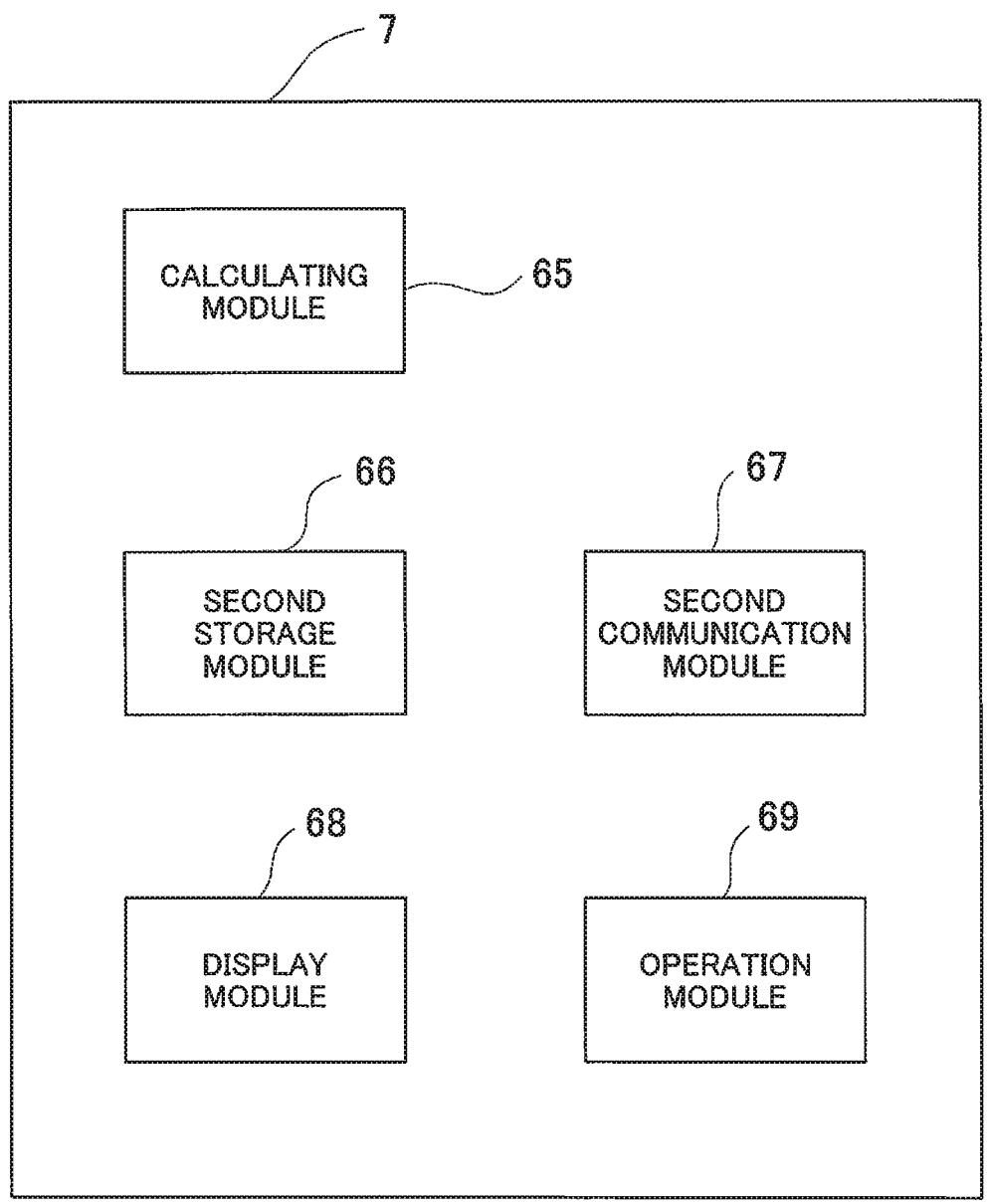
FIG. 3 is a schematical block diagram of an operation panel.

A description will be given on the operation panel 7 in brief by referring to FIG. 3.

The operation panel 7 may be provided in a fixed manner with respect to the monopod 3 as described above or may be attachable and detachable. Further, in a case where the operation panel 7 is attachable and detachable, the operation panel 7 may be removed from the monopod 3, and in a state of the operation panel 7 only, the worker may hold and operate the operation panel 7.

The operation panel 7 mainly includes a calculating module 65, a second storage module 66, the second communication module 67, the display module 68 and an operation module 69. It is to be noted that the display module 68 may be a touch panel, and the display module 68 may also serve as the operation module 69. Further, in a case where the display module 68 is made as the touch panel, the operation module 69 may be omitted. As the calculating module 65, a CPU specialized for this instrument or a general-purpose CPU is used, and the CPU executes programs stored in the second storage module 66 and performs a calculation, a processing and a control.

As the second storage module 66, various types of storage devices are used. These storage devices include: an HDD as a magnetic storage device, a CD or a DVD as an optical storage device, a memory card as a semiconductor storage device, a USB and other storage devices. Various types of programs are stored in the second storage module 66. These programs include: a communication program for performing a communicating with the surveying instrument main body 4, an image processing program for performing a processing such as a synthesizing of the image acquired by the lower image pickup module 5 and the image acquired by the measuring direction image pickup module 21, a display program for displaying the image acquired by the lower image pickup module 5, the image acquired by the measuring direction image pickup module 21 and a measurement information measured by the distance measuring unit 24 on the display module 68, a command creating program for creating a command for the surveying instrument main body 4 based on the information operated by the operation module 69 and other programs.

The second communication module 67 communicates data such as the measurement data, the image data, the command and the like, with the image processing module 17 via the arithmetic control module 14 and the first communication module 18.

The display module 68 displays a measurement result such as a measurement state, a distance, or a deflection angle of the surveying instrument main body 4, and displays the images acquired by the lower image pickup module 5 and the measuring direction image pickup module 21, or the image subjected to the image processing by the image processing module 17. Further, the display module 68 can superimpose and display the image acquired by the measuring direction image pickup module 21 and a scan locus. Further, the display module 68 can display a synthesize image by matching a plurality of images associated with each other based on a feature point and the like.

As the operation panel 7, a smartphone or a tablet may be used, for instance. Further, the operation panel 7 may be used as a data collector.

Next, a description will be given on a measuring operation of the surveying instrument 1 by referring to FIG. 1, FIG. 2, FIG. 3, FIG. 4A, FIG. 4B and FIG. 5. It is to be noted that the following measuring operation is performed by the arithmetic control module 14 which executes the programs stored in the first storage module 15.

As a preparation for starting the measurement, the lower end of the monopod 3 is positioned at the reference point "R", and the monopod 3 is held by the worker. It is to be noted that the operation panel 7 remains in a state mounted on the monopod 3. Further, the surveying instrument 1 is installed in a condition where the lower image pickup module 5 and the measuring direction image pickup module 21 operate.

In a case where the reference optical axis "O" is directed toward the object to be measured 2, the monopod 3 is rotated around the lower end of the monopod 3, or the monopod 3 is tilted in the front, rear, left and right directions or spirally rotated. The observation image is displayed on the display module 68. The reference optical axis "O" is positioned 6° below with respect to the center of the observation image. A direction and a position of the reference optical axis "O" can be confirmed from the observation image. An inclination angle and a change in the inclination angle of the monopod 3 at this moment are detected by the attitude detector 20.

In a state where the direction of the reference optical axis "O" is determined (fixed), a measurable deflection range (that is, a range where the distance measuring optical axis 35 can be deflected by the optical axis deflector 19) around the reference optical axis "O" can be confirmed on the observation image. The worker can designate an arbitrary point in the measurable range in the observation image as a measuring point (object to be measured 2). By a designation of the object to be measured 2, the arithmetic control module 14 directs the distance measuring optical axis 35 toward the object to be measured 2 by using the optical axis deflector 19.

The distance measuring optical axis 35 is directed toward the object to be measured 2, the distance measuring light 33 is irradiated, and the measurement (a distance measurement, an angle measurement) of the object to be measured 2 is carried out. A direction of the distance measuring light 33, a distance measurement result and the like are displayed on the display module 68. Further, the measuring direction image pickup module 21 acquires a first image in synchronization with the measurement of the object to be measured 2.

In a case where the object to be measured 2 is changed or the surveying instrument 1 is moved, the measuring point can be again designated from the observation image. On the other hand, the measuring point can be moved by tilting or rotating the monopod 3 while displaying the observation image on the display module 68.

In a case where a sighting state of the distance measuring optical axis 35, that is, a state where the distance measuring optical axis 35 coincides with the object to the measured 2, is maintained, the measurement worker may hold the monopod 3, or the auxiliary leg 6 may be pulled out and the monopod 3 may be supported by the auxiliary leg 6.

By supporting the monopod 3 by the auxiliary leg 6, an inclination of the monopod 3 in the front-and-rear direction and the rotation around the lower end of the monopod 3 is limited and a support state of the surveying instrument 1 becomes stable.

It is to be noted that the tilt angle and the tilting direction of the surveying instrument 1 with respect to the horizontal are detected by the attitude detector 20 in real time and thus, the measurement result can be corrected in real time based on the detection result. Therefore, a leveling work for adjusting the surveying instrument 1 to the horizontal is not needed, and the fluctuation of the tilt angle caused by a slight swing or the like, which is generated by a holding of the monopod 3 by the worker, can be also corrected in real time.

In the above description, the measurement is performed with the same action as the action of the total station in a state where the distance measuring optical axis 35 is fixed at the measuring point, but the measurement can be likewise performed by using the surveying instrument 1 as a laser scanner.

Further, when the observation image acquired by the measuring direction image pickup module 21 is synthesized with the lower image acquired by the lower image pickup module 5, the wide-range synthesized image including the reference point "R" to the object to be measured 2 can be acquired, and it facilitates a confirmation of a measurement range and a measuring position and improves the workability. Further, when the observation image or the synthesized image is associated with the data along the locus, which is acquired by a two-dimensional scan, an image with three-dimensional data can be acquired per each pixel. Further, the three-dimensional data of a part which deviates from the two-dimensional scan can be complemented by the photogrammetry.

It is to be noted that calculations such as the calculation of the rotation angle, the calculation of the tilt angle of the distance measuring optical axis 35, the calculation of the horizontal distance and the like may be performed by the arithmetic control module 14 or may be performed by the calculating module 65.

Further, at the time of moving the surveying instrument main body 4, in a state where a lower end of the monopod 3 is placed at a reference point R (a first installing point 82) having the known three-dimensional coordinates, the monopod 3 may be tilted or spirally rotated. Alternatively, the monopod 3 may be moved from the reference point R to another installing point (a second installing point 83).

A description will now be given on a case where both the acquisition of the point cloud data by the surveying instrument main body 4 and the photogrammetry by the measuring direction image pickup module 21 are used together with reference to the flowcharts of FIG. 4 and FIG. 5.

Figure 4:
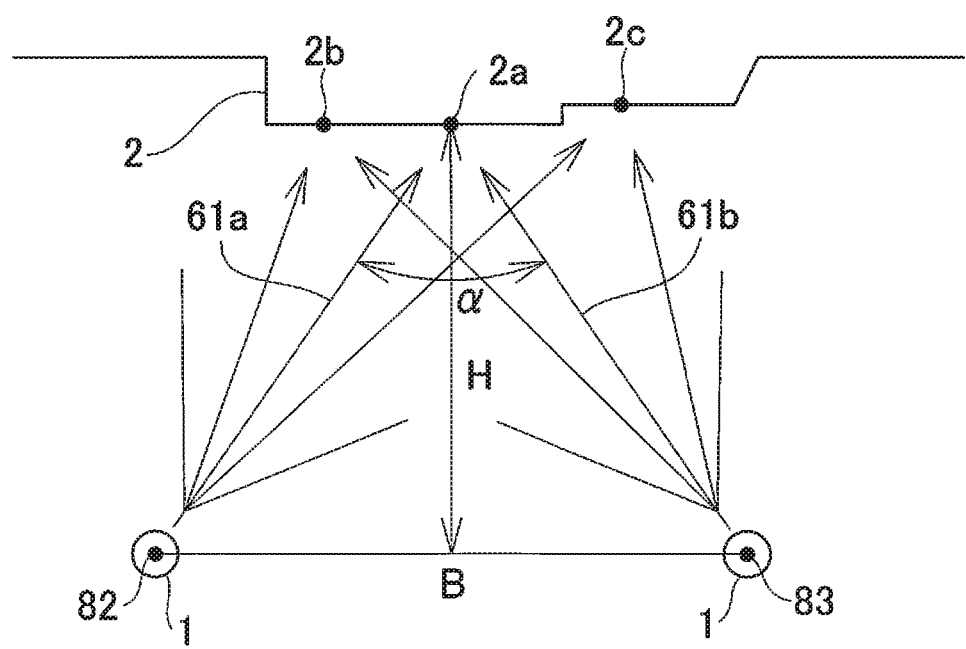
FIG. 4 is an explanatory drawing to explain the measurement using the surveying instrument according to the first embodiment of the present invention.
Figure 5:
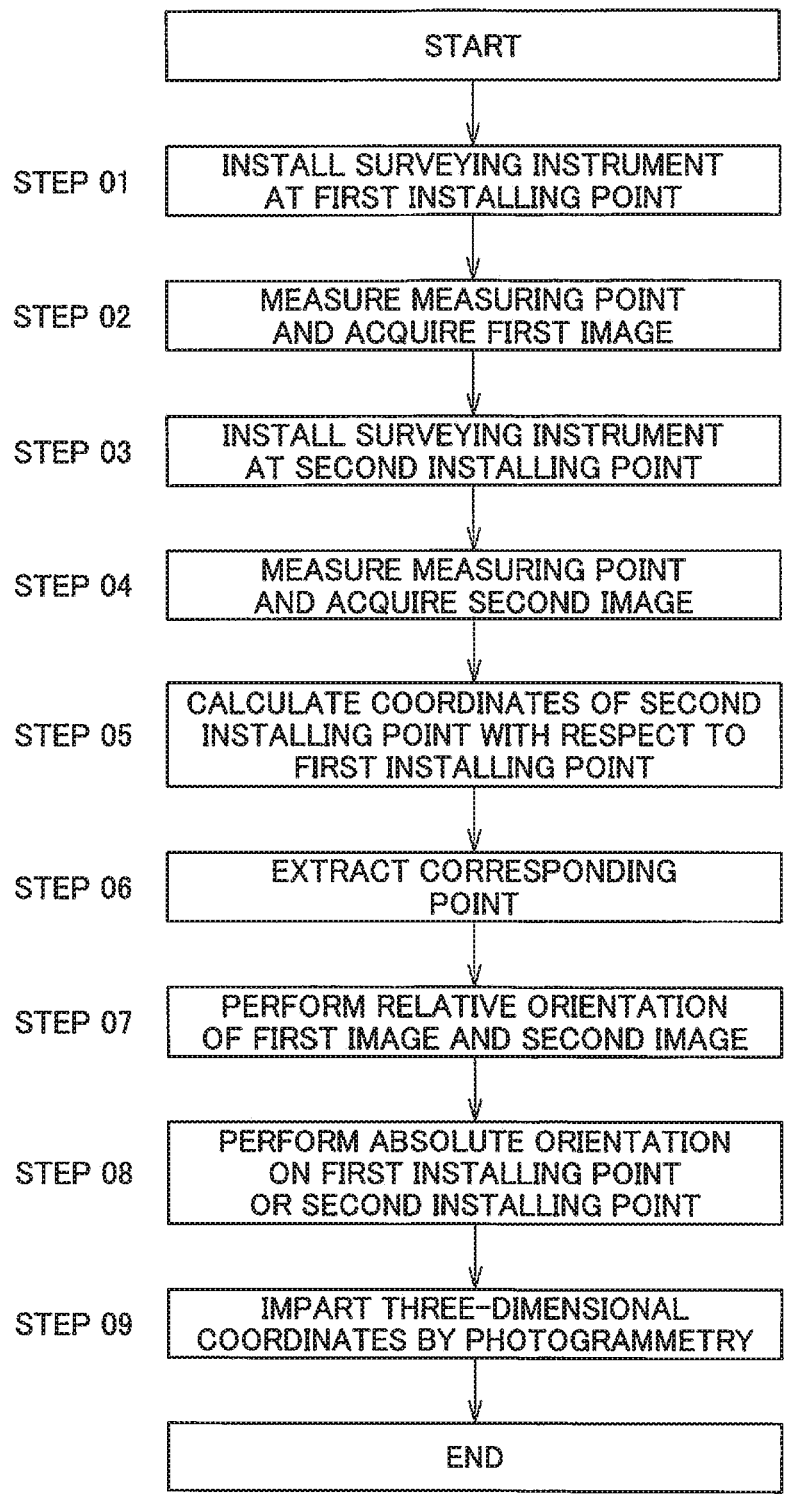
FIG. 5 is a flowchart to explain the measurement using the surveying instrument according to the first embodiment of the present invention.

It is to be noted that, in FIG. 4, the measuring points 2a, 2b, and 2c are the common points which are arbitrarily selected, further the measuring points 2a, 2b and 2c fail within a range of the distance measurement and the angle measurement by the scan from the first installing point 82 and the second installing point 83, respectively. Further, FIG. 4 shows an example where, at the first installing point 82 and the second installing point 83, an optical axis of the measuring direction image pickup module 21 is substantially directed toward the measuring point 2a. It is to be noted that the measuring points 2a, 2b, and 2c which are common to the first installing point 82 and the second installing point 83 may be the points which can be obtained by the interpolation based on a scan locus. The measuring point may be one point or two points. Alternatively, the measuring point may be four or more points.

Further, when an image acquired by the measuring direction image pickup module 21 is matched with the scan data, the distortion correction (a internal orientation) can be performed. In the present embodiment, the internal orientation is performed in advance.

(Step 01) First, the lower end of the monopod 3 is adjusted to coincide with the first installing point 82, and the surveying instrument 1 is installed at the first installing point 82.

(Step 02) After installing the surveying instrument 1, the distance measurement and the angle measurement are performed based on the scan, and the measurement including the measuring points 2a, 2b, and 2c of the object to be measured 2 is carried out. Further, a first image (not shown) including the measuring points 2a, 2b, and 2c is acquired by the measuring direction image pickup module 21 in synchronization with the scan at the first installing point 82. At this time, the arithmetic control module 14 corrects the first image based on a detection result of the attitude detector 20, and provides a vertical image.

(Step 03) When the measurement at the first installing point 82 is completed, the surveying instrument 1 is moved, the lower end of the monopod 3 is adjusted to coincide with the second installing point 83, and the surveying instrument 1 is installed at the second installing point 83.

(Step 04) After installing the surveying instrument 1, the distance measurement and the angle measurement are performed based on the scan, and the measurement including the measuring points 2a, 2b, and 2c of the object to be measured 2 is carried out from the second installing point 83. Further, a second image (not shown) including the measuring points 2a, 2b, and 2c is acquired by the measuring direction image pickup module 21 in synchronization with the scan at the second installing point 83. At this time, the arithmetic control module 14 corrects the second image based on a detection result of the attitude detector 20, and provides a vertical image.

(Step 05) The first installing point 82 is a point having the known three-dimensional coordinates. Therefore, from the first installing point 82, the three-dimensional coordinates of the measuring points 2a, 2b, and 2c with reference to the first installing point 82 can be acquired. On the other hand, from the second installing point 83, the three-dimensional coordinates of the measuring points 2a, 2b, and 2c with reference to the second installing point 83 can be acquired.

The measuring points 2a, 2b and 2c measured from the first installing point 82 are the same points as those measured from the second installing point 83. Therefore, the arithmetic control module 14 can calculate the three-dimensional coordinates of the second installing point 83 with reference to the first installing point 82 based on the three-dimensional coordinates of the measuring points 2a, 2b, and 2c with reference to the first installing point 82 (a resection). That is, the first installing point 82, the second installing point 83, and the measuring points 2a, 2b, and 2c can be determined as the points on the same coordinate system. Further, based on the calculated coordinates, the arithmetic control module 14 can calculate a distance between the first installing point 82 and the second installing point 83.

(Step 06) Here, a distance between the first installing point 82 and the second installing point 83 is determined as a base line length B, a shortest distance to an arbitrary measuring point of the object to be measured 2 with respect to a straight line connecting the first installing point 82 and the second installing point 83 is determined as a distance H, and an angle formed between a line connecting an arbitrary measuring point with an image pickup position at the first installing point 82 and a line connecting an arbitrary measuring point with an image pickup position at the second installing point 83 is determined as an intersection angle $\alpha$. The intersection angle $\alpha$ is substantially determined by a ratio of the distance to an arbitrary measuring point with respect to the base line length B.

A resolution of the photogrammetry is determined by the pixels of a camera and a BH ratio (H/B). Therefore, in case of performing the photogrammetry, the resolution improves as the intersection angle $\alpha$ increases, that is, the BH ratio decreases, and hence a measurement accuracy is improved. In the present embodiment, the intersection angle with which the measurement accuracy can be sufficiently obtained is determined as a wide intersection angle (H/B<2). Further, the intersection angle with which the measurement accuracy cannot be sufficiently obtained is determined as a narrow intersection angle (H/B≥2).

In a case where the intersection angle α is the wide intersection angle, the measurement accuracy is improved, but a possibility in which a different feature point (or line) is determined as a corresponding point at the time of associating the first image with the second image increases. That is, a possibility of the occurrence of mismatching (an error of matching) increases.

In the present embodiment, at each of the first installing point 82 and the second installing point 83, the point cloud data near the arbitrary measuring point is acquired. That is, the point cloud data of an overlap portion of the first image and the second image and the vicinity of the overlap portion is acquired.

Therefore, the arithmetic control module 14 compares a measurement result of the feature point determined as the corresponding point or the vicinity of the feature point in the first image with a measurement result of the feature point determined as the corresponding point or the vicinity of the feature point in the second image. Further the arithmetic control module 14 can determine the corresponding point as an erroneous corresponding point in a case where a comparison result exceeds a threshold value as set in advance.

When the processing of described above is performed with respect to each feature point determined as a corresponding point, each corresponding point can be extracted, and a correct corresponding point alone can be acquired.

(Step 07) When the corresponding point has been extracted, the arithmetic control module 14 performs the matching of the first image and the second image based on the extracted corresponding point. Since the first image and second image used in this matching are the vertical images respectively, the matching in a vertical direction and a horizontal direction alone can suffice, and the matching can be rapidly and highly accurately carried out.

(Step 08) The arithmetic control module 14 performs the absolute orientation of the three-dimensional coordinates based on the distance measurement and the angle measurement by the scan from the first installing point 82 or the second installing point 63 and the detection result of the attitude detector 20.

(Step 09) Next, the arithmetic control module 14 calculates a positional relationship (the BH ratio) of the first installing point 82, the second installing point 83, and the object to be measured 2. Finally, the arithmetic control module 14 performs the photometry with respect to a position where point cloud data has not been acquired based on the BH ratio and the intersection angle, and imparts the three-dimensional coordinates. Further, the arithmetic control module 14 displays the object to be measured 2 in the display module 68 in correspondence with the BH ratio. For example, the object to be measured 2 having a narrow intersection angle (H/B≥2) is thinly (translucency) displayed. Alternatively, the object to be measured 2 is displayed with a degree of transparency corresponding to the BH ratio.

As described above, in the first embodiment, the scan and the photographing of the object to be measured 2 are concurrently carried out, and whether a corresponding point used in the matching is correct is determined based on the point cloud data acquired by the scan.

Therefore, since the mismatching produced when the first image and the second image have been matched with the use of the erroneous corresponding point can be suppressed, and the photogrammetry with the wide intersection angle is enabled, and the measurement accuracy by the photogrammetry can be improved.

Further, when the highly-accurate photogrammetry is enabled, the data of a position where no point cloud data has not been acquired can be complemented based on a measurement result obtained by the photogrammetry.

Therefore, since a scan interval at the time of performing the scan can be increased and the number of times of scan can be reduced, a measurement time for the object to be measured 2 can be shortened.

Further, as regards a feature point which has been determined as a corresponding point, one pixel may be enlarged to four pixels×four pixels, and the sub-pixel matching may be carried out.

Further, a plurality of images may be acquired at one installing point, the plurality of images may be averaged, and the photogrammetry may be performed based on an averaged image. When the plurality of images are averaged, the errors in the respective images can be reduced, and a matching accuracy can be improved It is to be note that, in the first embodiment, a position of the second installing point 83 with respect to the first installing point 82 is measured by the resection. On the other hand, a reference target which represents the first installing point 82, for instance, such as a reference pole or a reference pattern may be installed at the first installing point 82. In this case, when the reference pole is measured from the second installing point 83, the position of the second installing point 83 with respect to the first installing point 82 is measured.

Further, a GPS device may be provided to the surveying instrument 1, and a position of the first installing point 82 or the second installing point 83 may be measured by the GPS device.

Further, in the first embodiment, the images of the object to be measured 2 including the measuring points 2a, 2b, and 2c are acquired from the two installing points, but the images may be acquired from three or more installing points. Since the photogrammetry can be performed at the three or more installing points, a range of the photogrammetry expands, or the photogrammetry of a blind angle portion of the object to be measured 2 is enabled.

Furthermore, in the first embodiment, three measuring points 2a, 2b and 2c are used. However, a used measuring point may be at least one of three measuring points 2a, 2b and 2c.

Figure 7:
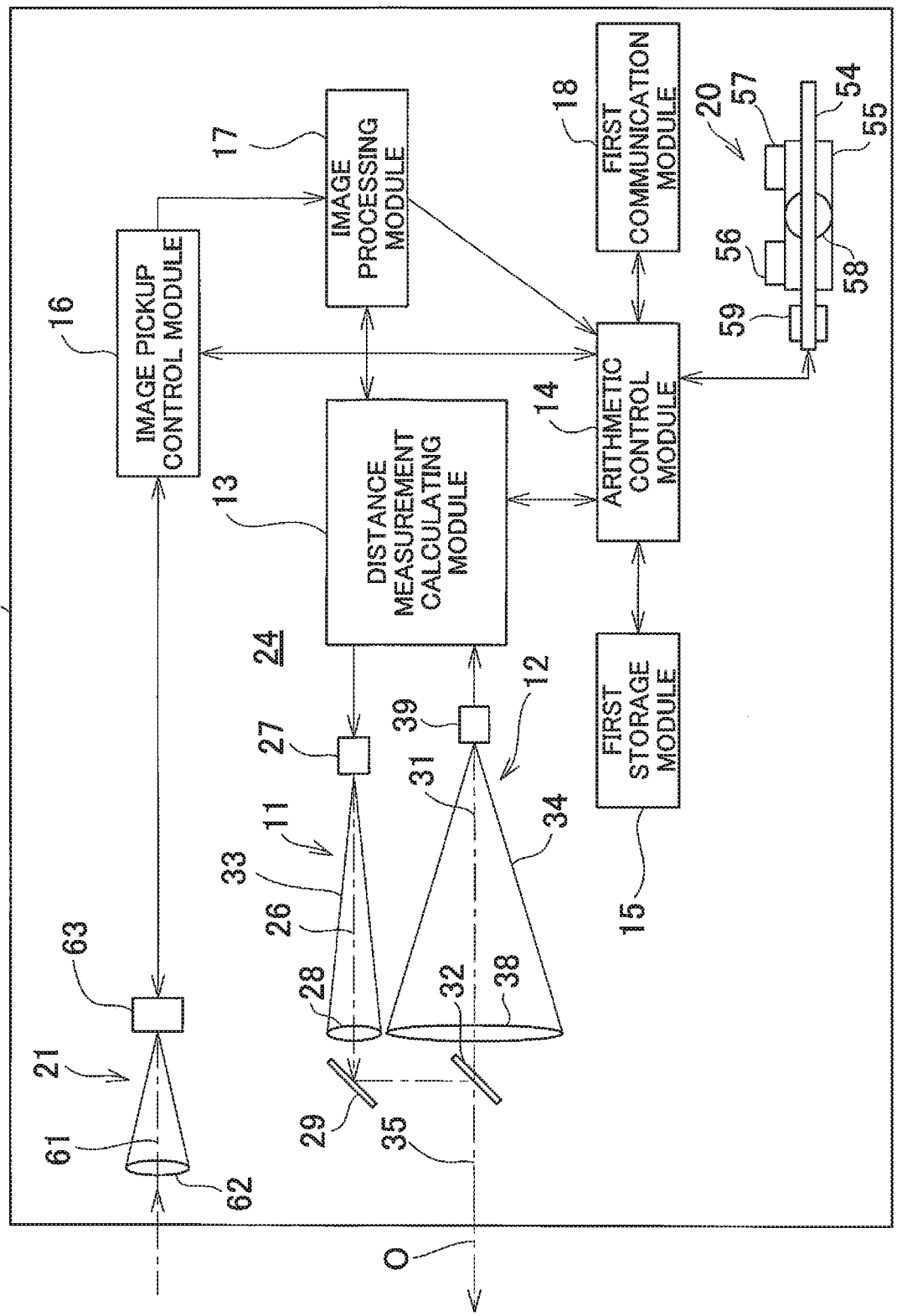
FIG. 7 is a schematical block diagram to show a surveying instrument, main body according to the second embodiment of the present invention.
Figure 8:
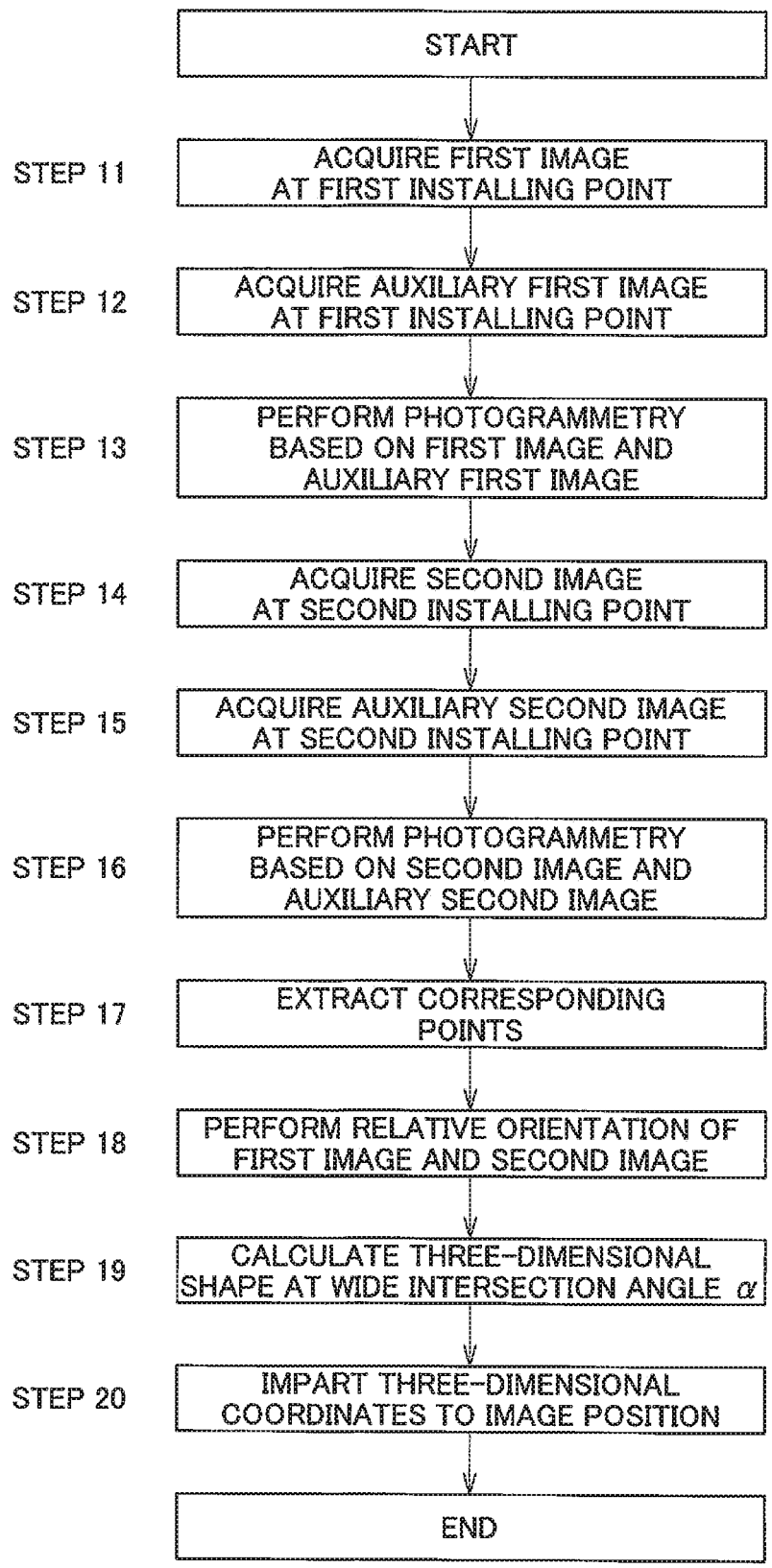
FIG. 8 is a flowchart to explain the measurement using the surveying instrument according to the second embodiment of the present invention.

Next, by referring to a flowchart of FIG. 6, FIG. 7, and FIG. 8, a description will be given on a second embodiment of the present invention. In the second embodiment, at least one of three measuring points 2a, 2b and 2c are used. It is to be noted that, in FIG. 6 and FIG. 7, the same components as shown in FIG. 1, FIG. 2, and FIG. 4 are referred by the same symbols, and a detailed description thereof will be omitted. As shown in FIG. 7, a surveying instrument main body 4 in the second embodiment has a configuration in which an optical axis deflector 19, a projecting direction detecting module 22, and a motor driver 23 are omitted from the first embodiment.

Figure 6:
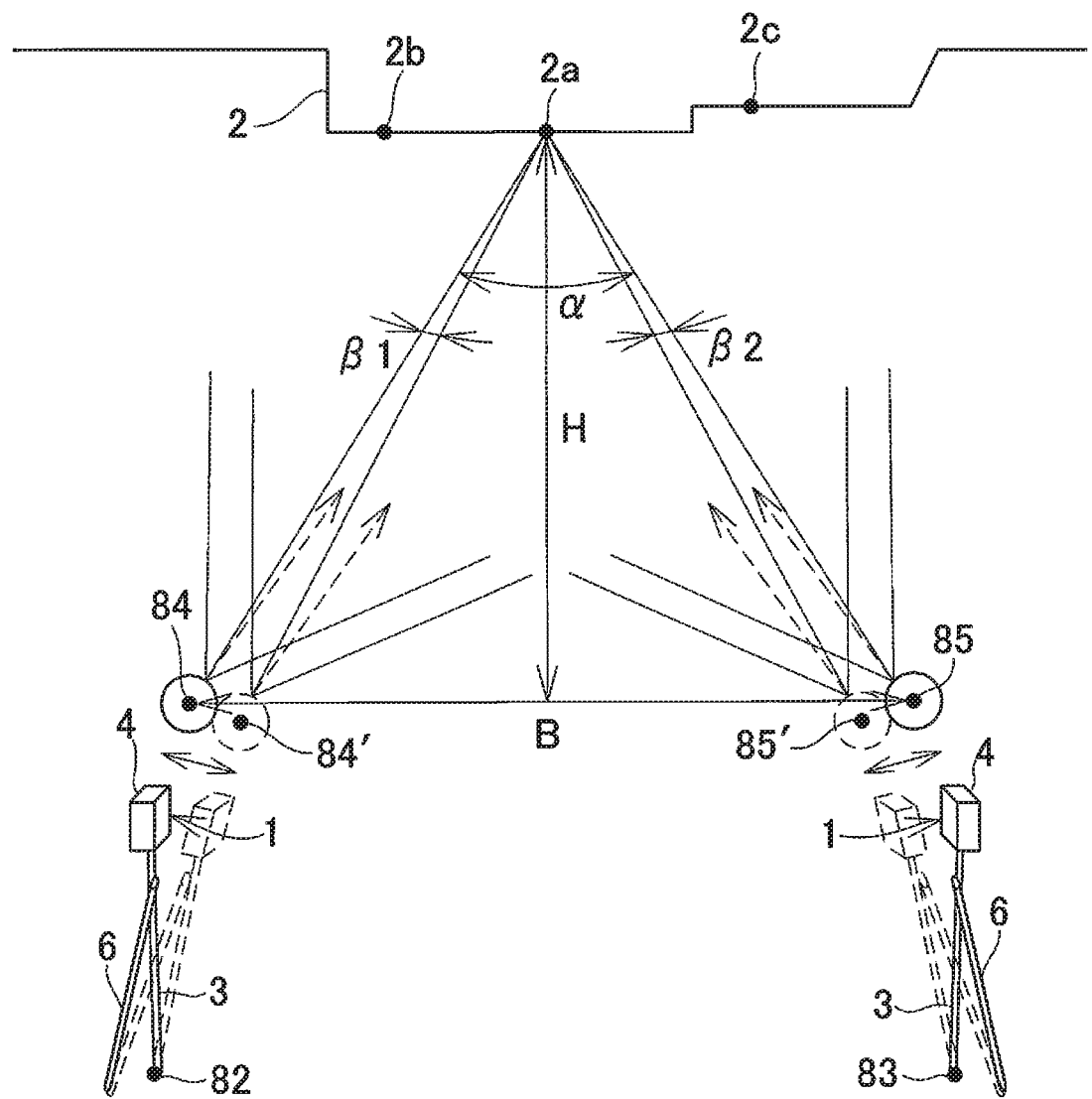
FIG. 6 is an explanatory drawing to explain the measurement using a surveying instrument according to a second embodiment of the present invention.

(Step 11) First, as shown in FIG. 6, a monopod 3 is installed at a first installing point 82 (a reference point) having a known three-dimensional coordinates. Next, in a state where an auxiliary led 6 is in contact with an installation surface, a distance to a measuring point 2a is measured at an arbitrary tilt, and a first image of an object to be measured 2 including the measuring point 2a is acquired.

(Step 12) Further, in a state where the monopod 3 and the auxiliary leg 6 are in contact with the installation surface, the surveying instrument 1 is tilted, and an auxiliary first image of the object to be measured 2 including the measuring point 2a is again acquired. It is to be noted that both the first image and the auxiliary first image are corrected into the vertical images based on a detection result of an attitude detector 20 (see FIG. 2). Further, it is needless to say that the images acquired at the following Steps are corrected into the vertical images.

(Step 13) When the surveying instrument 1 is tilted, since the tilt in a front-and-rear direction and the rotation are regulated by the auxiliary leg 6, the surveying instrument 1 tilts only in a left-and-right direction (a direction which is orthogonal with respect to a sighting direction) with respect to the object to be measured 2. That is, a machine center of the surveying instrument main body 4 can be considered to have moved parallel from a photographing position of the first image (a first photographing position 84) to a photographing position of the auxiliary first image (an auxiliary first photographing position 84').

A position of the machine center of the surveying instrument main body 4 at the first photographing position 84 with respect to the first installing point 82 can be calculated based on a detection result of the attitude detector 20 (that is, a tilt of the monopod 3 to a vertical line) and a distance from the lower end of the monopod 3 to the machine center. Similarly, a position of the machine center of the surveying instrument main body 4 at the auxiliary first photographing position 84' can be calculated. Therefore, the arithmetic control module 14 can calculate a distance between the first photographing position 84 and the auxiliary first photographing position 84'.

Further, between the first image and the auxiliary first image is produced a difference in image according to the movement from the first photographing position 84 to the auxiliary first photographing position 84'. The arithmetic control module 14 obtains a position of the measuring point 2a in each of both the images, obtains a difference between the positions of the measuring point 2a in the images, and then can calculate an intersection angle β1. Therefore, the arithmetic control module 14 can perform the photogrammetry of the object to be measured 2 based on the first image and the auxiliary first image.

It is to be noted that the intersection angle β1 obtained from the first image and the auxiliary first image is a narrow intersection angle (H/B≥2), the mismatching in the matching does not occur, but a resolution is low. Therefore, a rough three-dimensional shape of the object to be measured 2 can be obtained by the photogrammetry.

(Step 14) Next, the monopod 3 is installed at a second installing point 83, a distance to the measuring point 2a is measured at an arbitrary tilt in a state where the auxiliary leg 6 is in contact with the installation surface, and a second image of the object to be measured 2 including the measuring point 2a is acquired.

(Step 15) Further, in a state where the monopod 3 and the auxiliary leg 6 are in contact with the installation surface, the surveying instrument 1 is tilted, and an auxiliary second image of the object to be measured 2 including the measuring point 2a is again acquired.

(Step 16) Similar to (Step 13), the arithmetic control module 14 calculates a distance between a machine center (the second photographing position 85) when the second image is acquired and a machine center (the auxiliary second photographing position 85') when the auxiliary second image is acquired. Further, the arithmetic control module 14 calculates an intersection angle β2 based on a difference between a position of the measuring point 2a in the second image and the position of the measuring point 2a in the auxiliary second image. The intersection angle β2 is likewise a narrow intersection angle (H/B≥2). Further, the arithmetic control module 14 can perform the photogrammetry of the object to be measured 2 based on the second image and the auxiliary second image and obtain a rough three-dimensional shape.

(Step 17) Next, as a preliminary Step of the photogrammetry using the first image having a wide intersection angle α (H/B<2) and the second image, the arithmetic control module 14 extracts the feature points from the first image and the second image, respectively. Further, the arithmetic control module 14 extracts each feature point which represents a common part of the object to be measured 2 as a corresponding point in the first image and the second image.

In the present embodiment, the photogrammetry using the first image and the auxiliary first image is carried out at the first installing point 82, and the photogrammetry using the second image and the auxiliary second image is carried out at the second installing point 83. That is, the rough three-dimensional coordinate positions of the measuring point 2a and the feature points in the first image and the rough three-dimensional positions of the measuring point 2a and the feature points in the second image are calculated.

Therefore, the rough three-dimensional positions of the feature points determined as the corresponding points in the first image are compared with the rough three-dimensional positions of the feature points determined as the corresponding points in the second image with reference to the measuring point 2a, and each roughly-matched point is extracted as the corresponding point.

(Step 18) When each corresponding point has been extracted, the arithmetic control module 14 performs the matching of the first image and the second image based on the extracted corresponding point.

(Step 19) The arithmetic control module 14 calculates a three-dimensional shape of the object to be measured 2 at the wide intersection angle α based on the three-dimensional coordinates of the first installing point 82 or the three-dimensional coordinates of the second installing point 83.

(Step 20) Next, the arithmetic control module 14 calculates a positional relationship (the BH ratio) of the first installing point 82, the second installing point 83, and the object to be measured 2. Finally, the arithmetic control module 14 can acquire an image of the object to be measured 2 which the three-dimensional coordinates imparted with respect to a position (a pixel) of the image based on the BH ratio and the intersection angle α.

In the second embodiment, at each installing point, the image and the auxiliary image including the measuring point 2a are acquired respectively, the rough three-dimensional shape of the object to be measured 2 is obtained based on the photogrammetry using the image and the auxiliary image, and whether the corresponding points used in the matching are correct is determined based on the rough three-dimensional coordinates of the corresponding points.

Therefore, since the mismatching can be suppressed, the photogrammetry with a wide intersection angle becomes possible, and a measurement accuracy in the photogrammetry can be improved.

Further, in the second embodiment, the measuring point 2a alone requires the three-dimensional measurement, and thereafter the photogrammetry with a wide intersection angle can be performed. Therefore, the acquisition of point cloud data using the optical axis deflector 19 or the like can be omitted.

It is to be noted that, besides the measuring point 2a, the measuring points 2b and 2c can be additionally added as the three-dimensional measuring points. In this case, since a plurality of measuring points can be confirmed in the images, the number of distance measuring points increases, and a three-dimensional measurement accuracy is improved.

Further, in a case where a GPS device is provided to the surveying instrument 1, a position of the second installing point 83 with respect to the first installing point 82 does not have to acquire by the resection. Therefore, a distance measuring mechanism, an angle measuring mechanism, and the like can be omitted from the surveying instrument 1, and hence a device cost can be reduced.

It is to be noted that, in the second embodiment, the auxiliary leg 6 is provided to the monopod 3, and the image and the auxiliary image are acquired in a state where the tilt in the front-and-rear direction and the rotation of the monopod 3 are regulated, but the auxiliary leg 6 can be eliminated.

In this case, the arithmetic control module 14 can calculate the front, rear, left, and right tilt angles of the monopod 3 based on a detection result of the attitude detector 20, calculate a rotation angle of the monopod 3 from an image or the like acquired by a lower image pickup module 5 (see FIG. 1), and projection-convert an image based on the calculated tilt angles and rotation angle.

Further, in the second embodiment, the optical axis deflector 19 or the like for acquiring the point cloud data of the object to be measured 2 is omitted from the surveying instrument main body 4. On the other hand, needless to say, the surveying instrument main body 4 of the first embodiment including the optical axis deflector 19 or the like may be used.

Next, by referring to FIG. 9, a description will be given on a third embodiment of the present invention. It is to be noted that, in FIG. 9, the same component as shown in FIG. 6 are referred by the same symbols, and a detailed description thereof will be omitted.

The third embodiment has a configuration provided by combining the first embodiment with the second embodiment and also combining the scan with the photogrammetry according to a distance.

Figure 9:
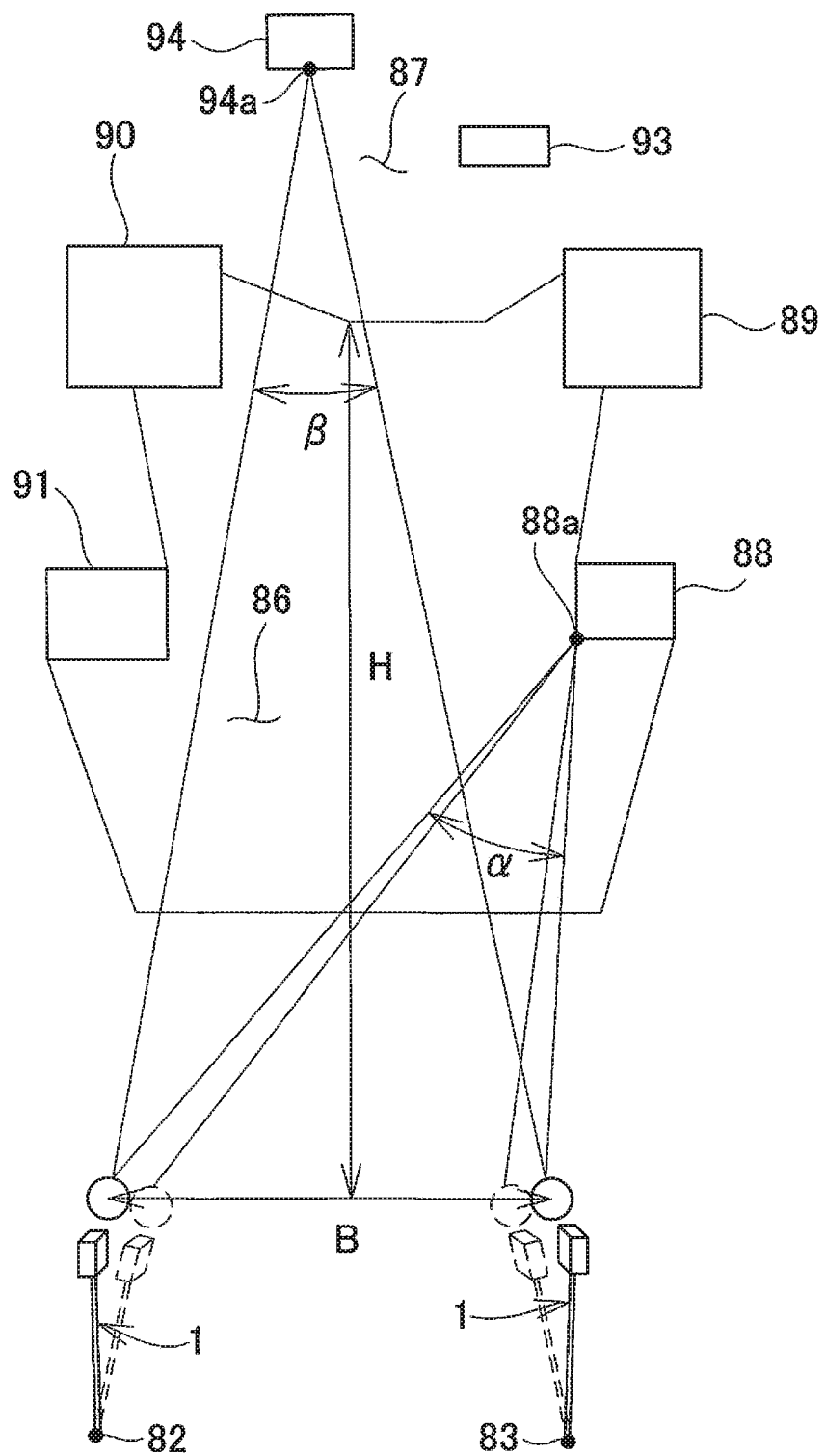
FIG. 9 is an explanatory drawing to explain the measurement using a surveying instrument according to a third embodiment of the present invention.

It is to be noted that, in FIG. 9, a range denoted by the reference numeral 86 is a range where the point cloud data can be acquired with the use of the distance measuring light 33 (see FIG. 2) and also a range (a accurate measurement area 86) where an intersection angle between a first installing point 82 and a second installing point 83 is a wide intersection angle (H/B<2). Further, in FIG. 9, a range represented by the reference numeral 87 is a range where the point cloud data cannot be acquired with the use of the distance measuring light 33 and also a range (a rough measurement area 87) where an intersection angle between the first installing point 82 and the second installing point 83 is a narrow intersection angle (H/B≥2).

Further, in FIG. 9, a first object to be measured 88, a second object to be measured 89, a third object to be measured 90 and a fourth object to be measured 91 are placed in the accurate measurement area 86, and a fifth object to be measured 93 and a sixth object to be measured 94 are placed in the rough measurement area 87.

For instance, in case of measuring a measuring point 88a of the first object to be measured 88 placed within the accurate measurement area 86, an intersection angle acquired by the first installing point 82 and the second installing point 83 is a wide intersection angle α, and hence the accurate photogrammetry is possible. Therefore, an image of the first object to be measured 88 with highly-accurate three-dimensional coordinates can be acquired per each pixel.

It is to be noted that the elimination of mismatching in the matching at this moment, that is, the extraction of a corresponding point may be carried out based on the point cloud data acquired at the time of scanning the first object to be measured 88. Alternatively, the extraction of the corresponding point may be carried out based on the rough three-dimensional coordinates acquired by the photogrammetry of an image and an auxiliary image acquired at each installing point.

Further, in case of measuring a measuring point 94a of the sixth object to be measured 94 placed in the rough measurement area 87, the distance measuring light 33 does not reach, an intersection angle acquired by the first installing point 82 and the second installing point 83 is a narrow intersection angle β, and hence the rough photogrammetry alone is possible. The rough photogrammetry can be used for the purpose of determining whether an object to be measured is present at a distance for which the scan is impossible or determining a rough extent of a distance to the object to be measured.

In the third embodiment, the highly accurate and highly dense measurement can be performed with respect to the object to be measured placed in the accurate measurement area 86 in a short time with the use of both the scan and the photogrammetry. Further, the rough measurement for the reference and the confirmation can be performed with respect to the object to be measured in the distant rough measurement area 87 where the scan measurement (the electronic distance measurement) is impossible, and the distance measurement data of a distant part which cannot perform the electronic distance measurement can be complemented by the photogrammetry. Therefore, a versatility and a workability of a surveying instrument 1 can be improved.

The invention claimed is:

1. A surveying instrument comprising a monopod which is movable and sequentially installed at least at a first installing point and a second installing point which is a predetermined position with respect to said first installing point and a surveying instrument main body which is provided at a known distance from a lower end of said monopod and at a known angle with respect to an axis of said monopod and has a reference optical axis, wherein said surveying instrument main body comprises a distance measuring unit configured to irradiate a distance measuring light, receive a reflected distance measuring light and measure a distance to an object to be measured, a measuring direction image pickup module which includes said object to be measured and is configured to acquire an observation image in a predetermined relationship with said reference optical axis, an attitude detector is configured to detect a tilt of said surveying instrument main body with respect to the horizontal or the vertical and an arithmetic control module configured to make said distance measuring unit perform a distance measurement of at least one predetermined measuring point and make said measuring direction image pickup module acquire an image of said object to be measured, and wherein said arithmetic control module is configured to extract each common corresponding point from a first image acquired at said first installing point and a second image acquired at said second installing point, compare a measurement result of said corresponding point or a vicinity of said corresponding point in said first image acquired by said distance measuring unit and a measurement result of said corresponding point or said vicinity of said corresponding point in said second image acquired by said distance measuring unit, extract a correct corresponding point based on a comparison result, perform the matching of said first image and said second image based on said correct corresponding point, and make a measurement of a positional relationship of said object to be measured with respect to said first installing point and said second installing point based on a matching image.

2. The surveying instrument according to claim 1, wherein said surveying instrument main body further comprising an optical axis deflector which deflects said distance measuring light with respect to said reference optical axis, and wherein said arithmetic control module is configured to make said optical axis deflector perform a scan using said distance measuring light by a predetermined scan pattern, make said distance measuring unit acquire the point cloud data along said predetermined scan pattern, complement the distance measurement data of a part deviating from said predetermined scan pattern by said photogrammetry, and acquire the three-dimensional data of said object to be measured.

3. The surveying instrument according to claim 2, wherein in a case where said object to be measured has a wide intersection angle with respect to said first image and said second image, wherein said arithmetic control module is configured to complement a distance measurement data by said photogrammetry with respect to a part deviating from said predetermined scan pattern where the electronic distance measurement by said distance measuring unit is impossible.

4. The surveying instrument according to claim 1, wherein said arithmetic control module is configured to tilt said monopod rightward or leftward with respect to said object to be measured after acquiring said first image, acquire an auxiliary first image, tilt said monopod rightward or leftward with respect to said object to be measured after acquiring said second image, acquire an auxiliary second image, perform the photogrammetry with a narrow intersection angle based on said first image and said auxiliary first image, calculate a rough three-dimensional position of said object to be measured with respect to said first installing point based on said photogrammetry, perform the photogrammetry with a narrow intersection angle based on said second image and said auxiliary second image, and calculate a rough three-dimensional position of said object to be measured with respect to said second installing point based on said photogrammetry.

5. The surveying instrument according to claim 4, wherein said arithmetic control module is configured to extract said common corresponding points from said first image and said second image, compare the rough three-dimensional positions of said corresponding points in said first image with the rough three-dimensional positions of said corresponding points in said second image, extract said corresponding points which are roughly matched with each other, and perform the matching of said first image and said second image based on said extracted corresponding points.

6. The surveying instrument according to claim 5, wherein said first image and said second image are the images acquired by a wide intersection angle.

7. The surveying instrument according to claim 4, wherein an auxiliary leg is provided to said monopod, and the tilt in a front-and-back direction and the rotation of said monopod is regulated by said auxiliary leg.

8. The surveying instrument according to claim 1, wherein said arithmetic control module is configured to measure a measuring point of an arbitrary position on said object to be measured from said first installing point, measure said measuring point from said second installing point, and calculate the three-dimensional coordinates of said second installing point with reference to a three-dimensional coordinate of said first installing point by a resection.

9. The surveying instrument according to claim 1, wherein a reference target is installed at said first installing point, wherein said arithmetic control module is configured to measure said reference target from said second installing point, and calculate a three-dimensional coordinate of said second installing point with reference to a three-dimensional coordinate of said first installing point based on a measurement result.

10. The surveying instrument according to claim 1, wherein said surveying instrument main body further comprising a GPS device, and the three-dimensional coordinates of said first installing point and said second installing point are acquired by said GPS device.

11. A photogrammetric method comprising: having a monopod installed at an installing point, a surveying instrument main body which is provided at a known distance from a lower end of said monopod and at a known position with respect to an axis of said monopod and has a reference optical axis, a measuring direction image pickup module which is provided to said surveying instrument main body, includes an object to be measured and is configured to acquire an observation image in a predetermined relationship with said reference optical axis, an attitude detector is configured to detect a tilt of said surveying instrument main body with respect to the horizontal or the vertical, and an arithmetic control module is configured to perform the acquisition of an image of said object to be measured, sequentially installing said monopod at least at a first installing point and a second installing point, acquiring at said first installing point a first image including said object to be measured and an auxiliary first image which has a narrow intersection angle with respect to said first image by a rightward or leftward tilt of said monopod with respect to said object to be measured from a first image acquisition state, performing the first photogrammetry with a narrow intersection angle based on said first image, said auxiliary first image, said known distance and a tilt detected by said attitude detector, acquiring at said second installing point a second image including said object to be measured and an auxiliary second image which has a narrow intersection angle with respect to said second image by a rightward or leftward tilt of said monopod with respect to said object to be measured from a second image acquisition state, performing the second photogrammetry with a narrow intersection angle based on said second image, said auxiliary second image, said known distance and a tilt detected by said attitude detector, extracting the corresponding points common to said first image and second image based on the rough three-dimensional positions acquired by said first photogrammetry and said second photogrammetry, performing the matching of said first image and said second image based on said extracted corresponding points and performing the third photogrammetry with a wide intersection angle.

12. The photogrammetric method according to claim 11, wherein each of said first image, said auxiliary first image, said second image and said auxiliary second image is a vertical image corrected based on a result obtained by said attitude detector.

13. The surveying instrument according to claim 5, wherein an auxiliary leg is provided to said monopod, and the tilt in a front-and-back direction and the rotation of said monopod is regulated by said auxiliary leg.

14. The surveying instrument according to claim 6, wherein an auxiliary leg is provided to said monopod, and the tilt in a front-and-back direction and the rotation of said monopod is regulated by said auxiliary leg.

15. The surveying instrument according to claim 2, wherein said arithmetic control module is configured to measure a measuring point of an arbitrary position on said object to be measured from said first installing point, measure said measuring point from said second installing point, and calculate the three-dimensional coordinates of said second installing point with reference to a three-dimensional coordinate of said first installing point by a resection.

16. The surveying instrument according to claim 3, wherein said arithmetic control module is configured to measure a measuring point of an arbitrary position on said object to be measured from said first installing point, measure said measuring point from said second installing point, and calculate the three-dimensional coordinates of said second installing point with reference to a three-dimensional coordinate of said first installing point by a resection.

17. The surveying instrument according to claim 2, wherein a reference target is installed at said first installing point, wherein said arithmetic control module is configured to measure said reference target from said second installing point, and calculate a three-dimensional coordinate of said second installing point with reference to a three-dimensional coordinate of said first installing point based on a measurement result.

18. The surveying instrument according to claim 3, wherein a reference target is installed at said first installing point, wherein said arithmetic control module is configured to measure said reference target from said second installing point, and calculate a three-dimensional coordinate of said second installing point with reference to a three-dimensional coordinate of said first installing point based on a measurement result.

19. The surveying instrument according to claim 2, wherein said surveying instrument main body further comprising a GPS device, and the three-dimensional coordinates of said first installing point and said second installing point are acquired by said GPS device.

20. The surveying instrument according to claim 3, wherein said surveying instrument main body further comprising a GPS device, and the three-dimensional coordinates of said first installing point and said second installing point are acquired by said GPS device.

* * * * *